United States Patent
Nakamura et al.

(10) Patent No.: US 7,457,839 B2
(45) Date of Patent: Nov. 25, 2008

(54) SELECTIVE REJECTION OF ACCESS TO PARAMETERS OF AN OPTION APPLICATION DETACHABLE FROM AN EMBEDDED APPARATUS INCLUDING WEB SERVER FUNCTION

(75) Inventors: Manabu Nakamura, Kanagawa (JP); Ryuhei Deno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 354 days.

(21) Appl. No.: 11/001,344

(22) Filed: Dec. 2, 2004

(65) Prior Publication Data

US 2005/0172000 A1    Aug. 4, 2005

(30) Foreign Application Priority Data

Dec. 3, 2003   (JP)   ............................. 2003-404706

(51) Int. Cl.
*G06F 15/16*   (2006.01)
(52) U.S. Cl. ...................................... 709/203; 358/1.16
(58) Field of Classification Search ................. 709/203; 358/1.16; 711/100
See application file for complete search history.

(56) References Cited

U.S. PATENT DOCUMENTS

| | | | | |
|---|---|---|---|---|
| 5,961,651 A * | 10/1999 | Gittins et al. ................... | 714/5 |
| 6,012,143 A * | 1/2000 | Tanaka ......................... | 726/20 |
| 7,149,450 B2 * | 12/2006 | Takemura .................... | 399/75 |
| 7,359,075 B2 * | 4/2008 | Kimura ....................... | 358/1.15 |
| 2001/0005457 A1 * | 6/2001 | Serizawa ...................... | 399/12 |
| 2002/0032772 A1 * | 3/2002 | Otstad et al. ................. | 709/224 |
| 2002/0120787 A1 * | 8/2002 | Shapiro et al. .............. | 709/311 |
| 2003/0231343 A1 * | 12/2003 | Kobayashi et al. ......... | 358/1.16 |
| 2004/0057074 A1 * | 3/2004 | Ohishi et al. ............... | 357/1.15 |
| 2004/0128349 A1 * | 7/2004 | Maruyama .................. | 709/203 |
| 2004/0148379 A1 * | 7/2004 | Ogura ......................... | 709/223 |
| 2005/0005204 A1 * | 1/2005 | Kobayashi .................... | 714/48 |

(Continued)

FOREIGN PATENT DOCUMENTS

JP          06-187334          7/1994

(Continued)

OTHER PUBLICATIONS

About BMLinks, BMLinkS Home Page, 2007, by Japan Business Machine and Information System Industries Association. pp. 1-7, Web page accessed on Jan. 29, 2007.*

(Continued)

*Primary Examiner*—Andrew Caldwell
*Assistant Examiner*—Oleg Survillo
(74) *Attorney, Agent, or Firm*—Oblon, Spivak, McClelland, Maier & Neustadt, P.C.

(57) ABSTRACT

In an embedded apparatus including a Web server function and a plug and play function which enables and disables an operation of an option application by a detachable recording medium recording the option application while the embedded apparatus is operating, an access executing part executes an access to parameters of the option application in response to an access request, a monitoring part monitors an existence of the option application, and an acceptance rejecting part rejects an acceptance of an access request and disabling the access executing part to access the option application when the monitoring part determines that the option application does not exist when the access request is received.

15 Claims, 15 Drawing Sheets

U.S. PATENT DOCUMENTS

| | | | |
|---|---|---|---|
| 2005/0050013 A1* | 3/2005 | Ferlitsch | 707/3 |
| 2005/0052664 A1* | 3/2005 | Ferlitsch | 358/1.6 |
| 2005/0091311 A1* | 4/2005 | Lund et al. | 709/203 |
| 2005/0097074 A1* | 5/2005 | Deno et al. | 707/1 |
| 2005/0114469 A1* | 5/2005 | Nakamura et al. | 709/218 |
| 2005/0117773 A1* | 6/2005 | Kobayashi | 382/100 |
| 2005/0180398 A1* | 8/2005 | Deno et al. | 370/352 |
| 2005/0240665 A1* | 10/2005 | Gu et al. | 709/220 |
| 2005/0246716 A1* | 11/2005 | Smith et al. | 719/315 |
| 2006/0132842 A1* | 6/2006 | Nakamura | 358/1.15 |
| 2006/0184661 A1* | 8/2006 | Weisman et al. | 709/224 |
| 2006/0271936 A1* | 11/2006 | Matsuda et al. | 718/102 |

FOREIGN PATENT DOCUMENTS

| | | |
|---|---|---|
| JP | 09-223096 | 8/1997 |
| JP | 10-173890 | 6/1998 |
| JP | 10-260929 | 9/1998 |
| JP | 2003-335028 * | 11/2003 |
| JP | 2004-185464 | 7/2004 |

OTHER PUBLICATIONS

What BMLinkS will make possible, BMLinkS Home Page, 2007, by Japan Business Machine and Information System Industries Association. p. 1. Web page accessed on Jan. 29, 2007.*

* cited by examiner

SELECTIVE REJECTION OF ACCESS TO PARAMETERS OF AN OPTION APPLICATION DETACHABLE FROM AN EMBEDDED APPARATUS INCLUDING WEB SERVER FUNCTION

BACKGROUND OF THE INVENTION

1. Field of the Invention

The present invention generally relates to an embedded apparatus including a Web server function for providing a Web service only when an option application recorded in a recording medium being detachable thereto.

2. Description of the Related Art

Recently, an image forming apparatus such as a facsimile, a copier, a printer, or a like provides information and executes a process through a network.

For example, Japanese Laid-open Patent Application Publication No. 10-173890discloses that a user sends an HTTP request from a Web browser and operates a facsimile transmission function of the image forming apparatus having a facsimile function.

Moreover, Japanese Laid-open Patent Application Publication No. 10-260929discloses that an adapter can be detachable even if a system is in an operation state, and a reconfiguration of the system can be automatically conducted when the adapter is attached to or detached from the system.

However, in an image forming apparatus including a Web server function in that the Web service can be provided by an option application recorded in a recording medium which is detachable at arbitrary timing, for example, even if the image forming apparatus is detached from the recording medium during the operation and the option application is in an invalid state, since setting information (parameters) of the option application is stored in a nonvolatile memory within the image forming apparatus (on board), a reference and settings of the setting information are disadvantageously allowed.

For example, a mechanism of an embedded apparatus implementing an operation system and an application such as the image forming apparatus other than an information processing apparatus is different from the information processing apparatus.

For example, as an apparatus detachable at arbitrary timing, the information processing apparatus supporting a plug and play such a USB (Universal Serial Bus) is well known. In the information processing apparatus, a management program (driver) operates and conducts a connection process or termination process by informing the operation system when a device is attached to or detached from the information processing apparatus through the USB.

In the image forming apparatus, a Secure Digital memory card (hereinafter, called SD card) is exampled as the same meaning of a USB device connected to the information processing apparatus through the USB. In the image forming apparatus, the driver detects a connection and a disconnection of the SD card but the driver cannot detect an existence of an application stored in the SD card.

In a case of the USB device, the setting information is stored by the USB device but not by the information processing apparatus. Accordingly, in a case in that the USB device is not connected to the information processing apparatus, settings cannot be changed. However, In a case of the image forming apparatus, since the setting information is stored in the nonvolatile memory within the image forming apparatus, the settings can be conducted even if the SD card is not connected to the image forming apparatus.

Japanese Laid-open Patent Application Publication No. 10-173890 and Japanese Laid-open Patent Application Publication No. 10-260929 do not disclose any mechanism to solve the above problem.

SUMMARY OF THE INVENTION

It is a general object of the present invention to provide embedded apparatuses in which the above-mentioned problems are eliminated.

A more specific object of the present invention is to provide an embedded apparatus which monitors an option application recorded in a recording medium detachable from the embedded apparatus to check an existence of the option application, and rejects an access concerning parameters of the option application when the option application does not exist.

An embedded apparatus includes an access executing unit, a monitoring unit, an acceptance rejecting unit, a Web page providing unit, an error response sending unit, a central processing unit, and a setting information maintaining unit. The access executing unit is configured to execute an access to parameters of an option application in response to an access request received from a user terminal through a network. The monitoring unit is configured to periodically monitor an existence of the option application. The acceptance rejecting unit is configured to reject an acceptance of the access request and disable the access executing unit to access the parameters of the option application when the monitoring unit determines that the option application does not exist when the access request is received. The Web page providing unit is configured to generate a Web page showing an execution result of the access executing unit and provide the Web page to an access request originator. The error response sending unit configured to send an error response to the access request originator. The central processing unit is configured to control the embedded apparatus. The setting information maintaining unit is configured to maintain the parameters of the option application within the embedded apparatus. The option application is stored on a recording medium that is configured to be detachable from the embedded apparatus. The embedded apparatus is configured to enable and disable an operation of the option application while the embedded apparatus is operating. The access executing unit is configured to process the access to the parameters of the option application and an access to a Web application residing in the embedded apparatus in common. The Web page providing unit is configured to generate the Web page showing the execution result to the option application. The acceptance rejecting unit is configured to execute the error response sending unit when an acceptance of the access request is rejected. The error response is a response to inform the originator of the access request that a Web page corresponding to the access request does not exist.

The setting information maintaining unit may be shared with the access executing unit and the option application.

The access executing unit may include a read-out executing unit configured to read out the parameters being maintained in a setting information maintaining unit when the access indicates a reference of the parameters.

The access executing unit may include a write-in executing unit configured to write the parameters in a setting information maintaining unit when the access indicates settings of the parameters.

The embedded apparatus may include a table managing unit and an existence determining unit. The table managing unit may be included in the monitoring unit. The table managing unit is configured to manage a table showing a correspondence between a URL to be indicated by the access request and a process function for executing each of executing units being implemented in the access executing-unit as a monitor result by the monitoring unit. The existence determining unit may be included in the monitoring unit. The existence determining unit is configured to determine an existence of the option application by searching for the URL indicated by the access request from the table being managed by the table managing unit. The monitoring unit is configured to maintain information showing the correspondence between the URL and the process function in the table when the option application exists and to delete the information showing the correspondence between the URL and the process function from the table when the option application does not exist. The acceptance rejecting unit is executed when the existence determining unit determines that the option application does not exist.

The embedded apparatus may include a distributing unit configured to distribute the access request by calling the process function corresponding to the URL when the existence determining unit determines that the option application exists.

An option application executing method, conducted in an embedded apparatus including a Web server function and a plug and play function which enables and disables an operation of an option application by a detachable recording medium recording the option application while the embedded apparatus is operating, includes: executing an access to parameters of the option application in response to an access request received from a user terminal through a network; monitoring periodically an existence of the option application; rejecting an acceptance of an access request and disabling the access to the parameters of the option application when it is determined in the monitoring an existence of the option application that the option application does not exist when the access request is received; generating a Web page showing an execution result and providing the Web page to an access request originator; sending an error response to the access request originator when the acceptance of the access request is rejected; and maintaining the parameters of the option application within the embedded apparatus.

A computer-readable recording medium recorded with a program for causing a computer, as an embedded apparatus including a Web server function and a plug and play function, to enable and disable an operation of an option application by a detachable recording medium recording the option application while the embedded apparatus is operating. The program, when executed, causes a processor to perform a method comprising: executing an access to parameters of the option application in response to an access request received from a user terminal through a network; monitoring periodically an existence of the option application; rejecting an acceptance of an access request and disabling the access to the option application when it is determined in the monitoring an existence of the option application that the option application does not exist when the access request is received; generating a Web page showing an execution result and providing the Web page to an access request originator; and sending an error response to the access request originator when the acceptance of the access request is rejected; and maintaining the parameters of the option application within the embedded apparatus.

A system includes an embedded apparatus and a user terminal to access parameters of an option application through a network. The embedded apparatus comprises an access executing unit, a monitoring unit, an acceptance rejection unit, a Web page providing unit, an error response sending unit, and a setting information maintaining unit. The access executing unit is configured to execute the access to the parameters of the option application in response to an access request received from the user terminal through the network. The monitoring unit is configured to periodically monitor an existence of the option application. The acceptance rejecting unit is configured to reject an acceptance of an access request received from the user terminal through the network, and to disable access to the parameters of the option application when it is determined by the monitoring unit that the option application does not exist when the access request is received. The Web page providing unit is configured to generate a Web page showing an execution result by an access executing unit and provide the Web page to an access request originator. The error response sending unit is configured to send an error response to the access request originator. The setting information maintaining unit is configured to maintain parameters of the option application within the embedded apparatus. The option application is stored on a recording medium configured to be detachable from the embedded apparatus. The embedded apparatus is configured to enable and disable an operation of the option application while the embedded apparatus is operating. The access executing unit is configured to process the access to the parameters of the option application and an access to a Web application residing in the embedded apparatus in common. The Web page providing unit is configured to generate the Web page showing the execution result of the parameters of the option application. The acceptance rejecting unit is configured to execute the error response sending unit when an acceptance of the access request is rejected. The error response is a response to inform the originator of the access request that a Web page corresponding to the access request does not exist.

The embedded apparatus may include a storage medium interface configured to be detachably connected to the recording medium.

The embedded apparatus may include a storage unit configured to store information.

An embedded apparatus comprises a central processing unit that controls the embedded apparatus, a storage medium interface to be detachably connected to a recording medium, and a storage unit that stores information. The embedded apparatus also comprises an access executing unit, a monitoring unit, an acceptance rejecting unit, and a Web page providing unit. The access executing unit is configured to execute an access to setting information of an option application in response to an access request received from a user terminal through a network, the setting information being stored in the storage unit in the embedded apparatus. The monitoring unit is configured to periodically monitor an existence of the option application stored on the recording medium configured to be detachable from the storage medium interface. The acceptance rejecting unit is configured to reject an acceptance of the access request and disable the access executing unit to access the setting information of the option application when the monitoring unit determines that the option application does not exist when the access request is received. The Web page providing unit is configured to generate a Web page showing an execution result of the access executing unit in response to the access request and provide the Web page to an access request originator when the monitoring unit determines that the option application exists and the access executing unit executes the access to the setting information of the option application. The embedded apparatus is configured to enable and disable an operation of the option application while the embedded apparatus is operating.

The embedded apparatus may include an error response sending unit. The error response sending unit is configured to send an error response to the access request originator. The acceptance rejecting unit is configured to execute the error response sending unit when rejecting the acceptance of the access request. The error response is a response to inform the access request originator that a Web page of the setting information corresponding to the access request does not exist.

The Web page providing unit may generate the Web page showing the execution result concerning the option application in response to the access request when the monitoring unit determines that the option application exists.

The access executing unit may process the access to the setting information of the option application and an access to the setting information of a Web application residing in the embedded apparatus in common.

The above objects of the present invention can be achieved by a computer-executable program for causing a computer as an embedded apparatus to conduct processes described above in the embedded apparatus or by a computer-readable recording medium recorded with the program code.

BRIEF DESCRIPTION OF THE DRAWINGS

In the following, embodiments of the present invention will be described with reference to the accompanying drawings.

DESCRIPTION OF THE PREFERRED EMBODIMENT

In the following, an embodiment of the present invention will be described with reference to the accompanying drawings.

An image forming apparatus according to the embodiment of the present invention accommodates each function of devices such as a printer, a copier, a facsimile, a scanner, and a like in a single chassis, and can provide information concerning an image formation by a plurality of applications. For example, a configuration of the image processing system including the image forming apparatus is shown in FIG. 1

Figure 1:
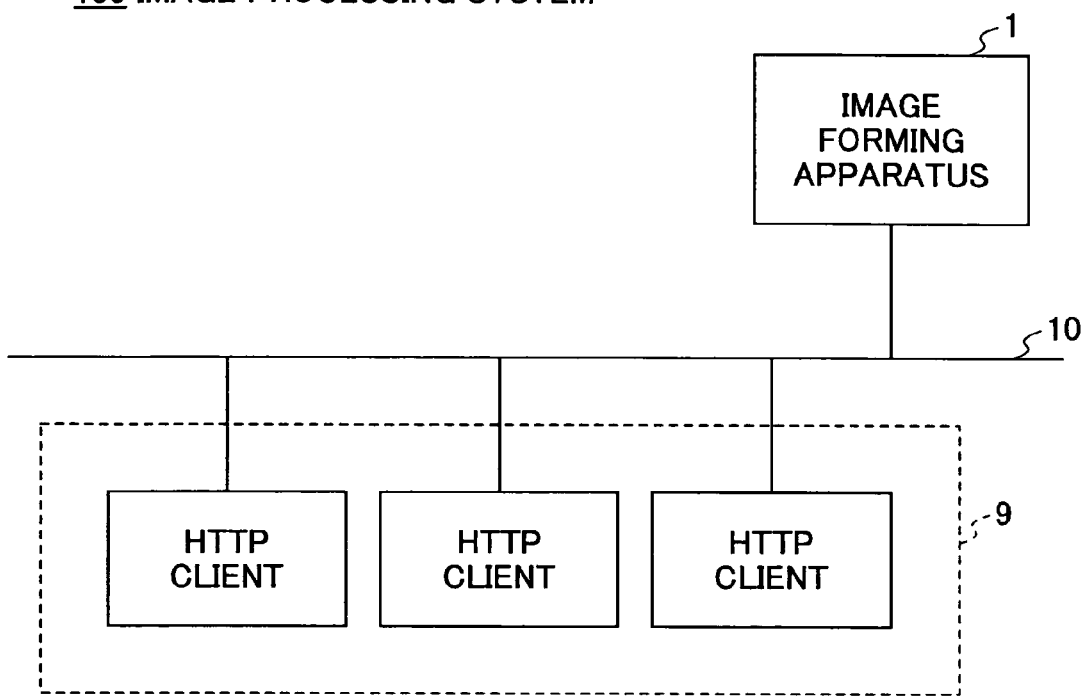
FIG. 1 is a diagram showing a configuration of an image processing system according to an embodiment of the present invention.

FIG. 1 is a diagram showing the configuration of the image processing system according to the embodiment of the present invention. In the image processing system 100 as shown in FIG. 1, a plurality of HTTP (HyperText Transfer Protocol) clients 9 are connected to an image forming apparatus 1 through a network such as a LAN (Local Area Network), the Internet, or the like.

In response to a request from the HTTP client 9, the image forming apparatus 1 executes a process to print out document data, send the document data by fax, or a like. Moreover, in response to an HTTP request, the image forming apparatus 1 sends the HTTP client 9 a Web page to display information requested by the HTTP request. For example, in a case in that a user using the HTTP client 9 requests status information of the image forming apparatus 1 at a Web browser, the image forming apparatus 1 sends HTML (HyperText Markup Language) data including the status information to the HTTP client 9. The HTTP client 9 is a terminal such as a PC (Personal Computer), a PDA (Personal Digital Assistant), a mobile phone, or a like, which the user directly uses, and includes the Web browser to display a Web page sent from the image forming apparatus 1.

Figure 2:
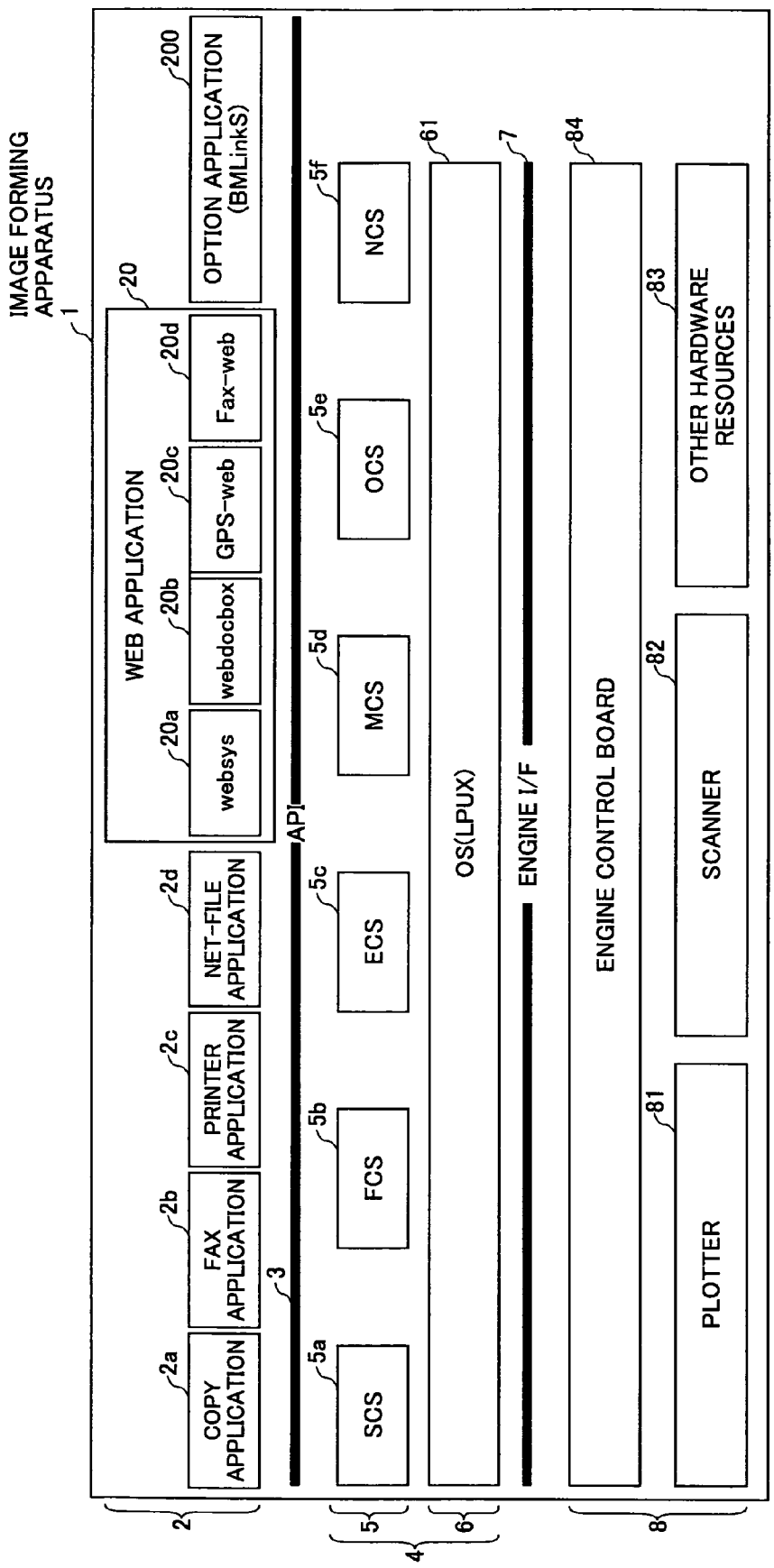
FIG. 2 is a diagram showing a functional configuration of the image forming apparatus according to the embodiment of the present invention.

FIG. 2 is a diagram showing a functional configuration of the image forming apparatus according to the embodiment of the present invention.

In FIG. 2, the image forming apparatus 1 includes an application layer 2, a platform layer 4, and an engine part 8. The interface 3 is an interface (API (Application Program Interface)) being provided by the platform layer 4 for the application layer 2, and the interface 7 is an interface (engine interface ( )I/F)) provided between the platform layer 4 and the engine part 8.

The application layer 2 is a software group for conducting various processes in the image forming apparatus 1, and includes a copy application 2a that is an application for a copy, a fax application 2b that is an application for a fax, a printer application 2c that is an application for a printer, and a net-file application 2d that is an application for a network file.

Moreover, the Web application 20 is an application group, which is implemented in the image forming apparatus 1 beforehand (on board), for conducting various Web services in accordance with an HTTP protocol, a Websys 20a as a Web application for allowing a user using the Web browser to browse a status of each device as each function of various image formation and conduct network settings of each device, a webdocbox 20*b* as a Web application for allowing the user using the Web browser to retrieve a document and conduct a document management, a GPS-web 20*c* as a Web application for displaying a job history (spool status) of a printer, and a Fax-web 20*d* as a Web application for displaying initial settings of the facsimile and a communication management report (communication history) of the facsimile.

Furthermore, similar to the Web application 20, the option application 200 is an application for conducting the Web service in accordance with the HTTP protocol. For example, the option application 200 includes at least one application, which is provided to the image forming apparatus 1 by mounting a memory card such as a SD card (Secure Digital memory) storing the application.

It should be noted that a library (platform) is accordingly provided between the applications and the interface 3 to provide a common function to each application and to make it easy to develop software.

On the other hand, the platform layer 4 is a software group for providing common service functions each application in the application layer 2 through the interface 3, and includes a service layer 5 and an OS (Operation System) layer 6. The service layer 5 includes an SCS (System Control Service) 5*a* including a plurality of functions such as an application management, an operation control, a system screen display, an LED (Light Emitting Diode) display, a resource management, an interruption control, and a like, an FCS (FAX Control Service) 5*b* providing an API of a facsimile function, an ECS (Engine Control Service) 5*c* for controlling the engine part, an MCS (Memory Control Service) 5*d* for conducting a memory control, an OCS (Operation panel Control Service) 5*e* for controlling an operation panel being an interface to an operator (user), and an NCS (Network Control Service) 5*f* for providing a common service shared with applications requiring an network input/output. The OS layer 6 includes an OS (LPUX) 61.

The engine part 8 includes various engines such as a plotter 81, a scanner 82, and other hardware resources, and an engine control board 84.

Figure 3:
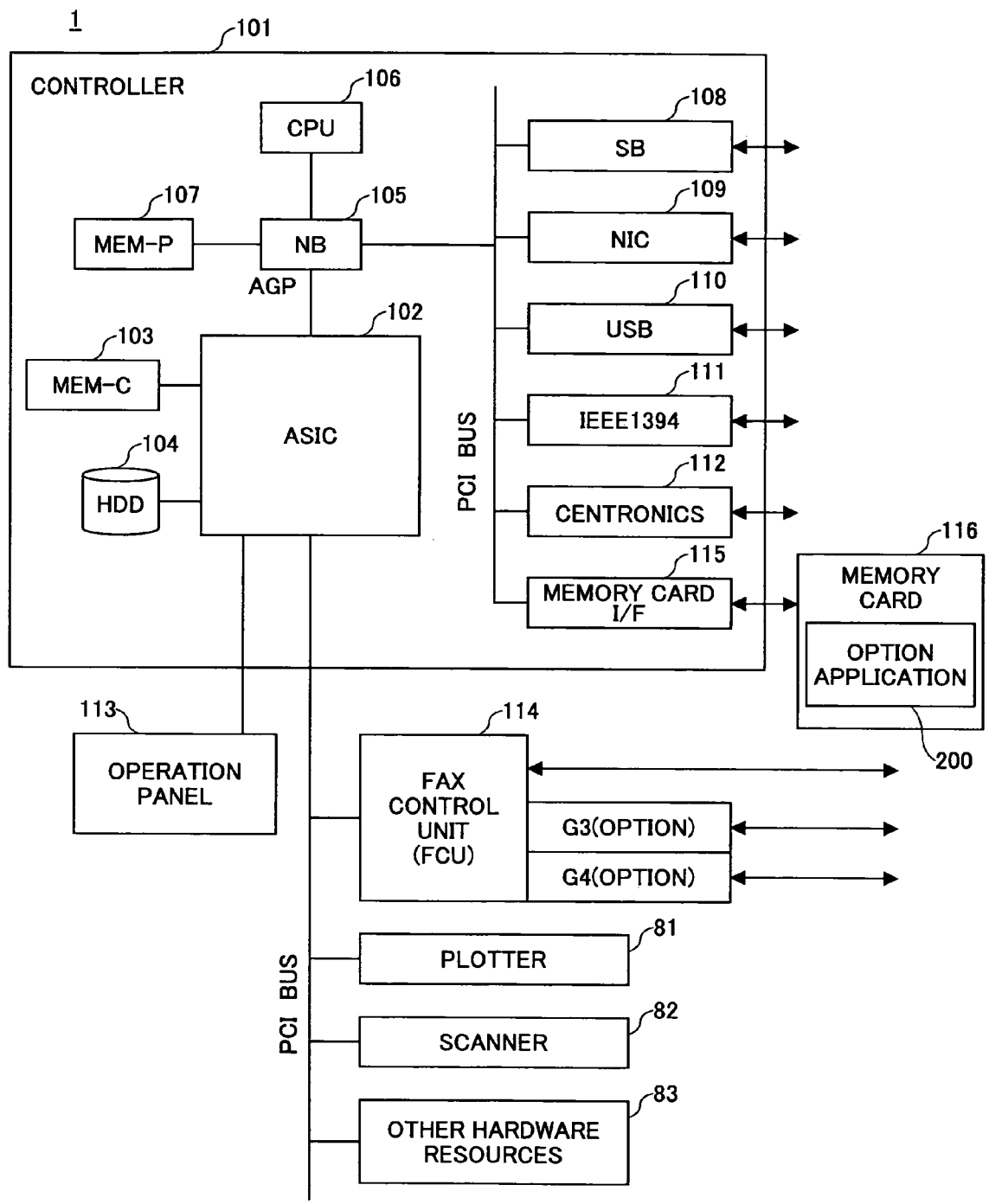
FIG. 3 is a block diagram showing a hardware configuration of the image forming apparatus according to the embodiment of the present invention.

FIG. 3 is a block diagram showing a hardware configuration of the image forming apparatus according to the embodiment of the present invention.

In FIG. 3, the image forming apparatus 1 is configured by connecting an operation panel 113, a fax control unit (FCU) 114, the plotter 81, the scanner 82, and the other hardware resources 83 to a controller 101 for mainly conducting a control operation for the image forming apparatus 1.

In the controller 101, a CPU (Central Processing Unit) 106 being an IC (Integrated Circuit) for a general control is connected to an ASIC (Application Specific Integrated Circuit) 102 being an IC for an image process through a NB (North Bridge) 105 provided as a bridge between the CPU 106 and the ASIC 102. Moreover, an SB (South Bridge) 108 provided as a bridge for connecting peripheral devices and a like, a NIC (Network Interface Card) 109 for controlling a network communication, a USB (Universal Serial Bus) 110 providing a USB interface, an IEEE 1394 111 providing an IEEE 1394 interface, a centronics 112 providing a centronics interface, a memory card interface 115 for inputting and outputting a program and data to/from a memory card 116 such as the SD card or the like storing the option application 200, to a bus (PCI bus) of the NB 105. Furthermore, in the controller 101, a MEM-C 103 and a HDD (Hard Disk Drive) 104 as storage units are connected to the ASIC 102, and a MEM-P 107 as a storage unit is connected to the NB 105. A memory card interface 115 may use a part or the entire function of the USB 110.

Figure 4:
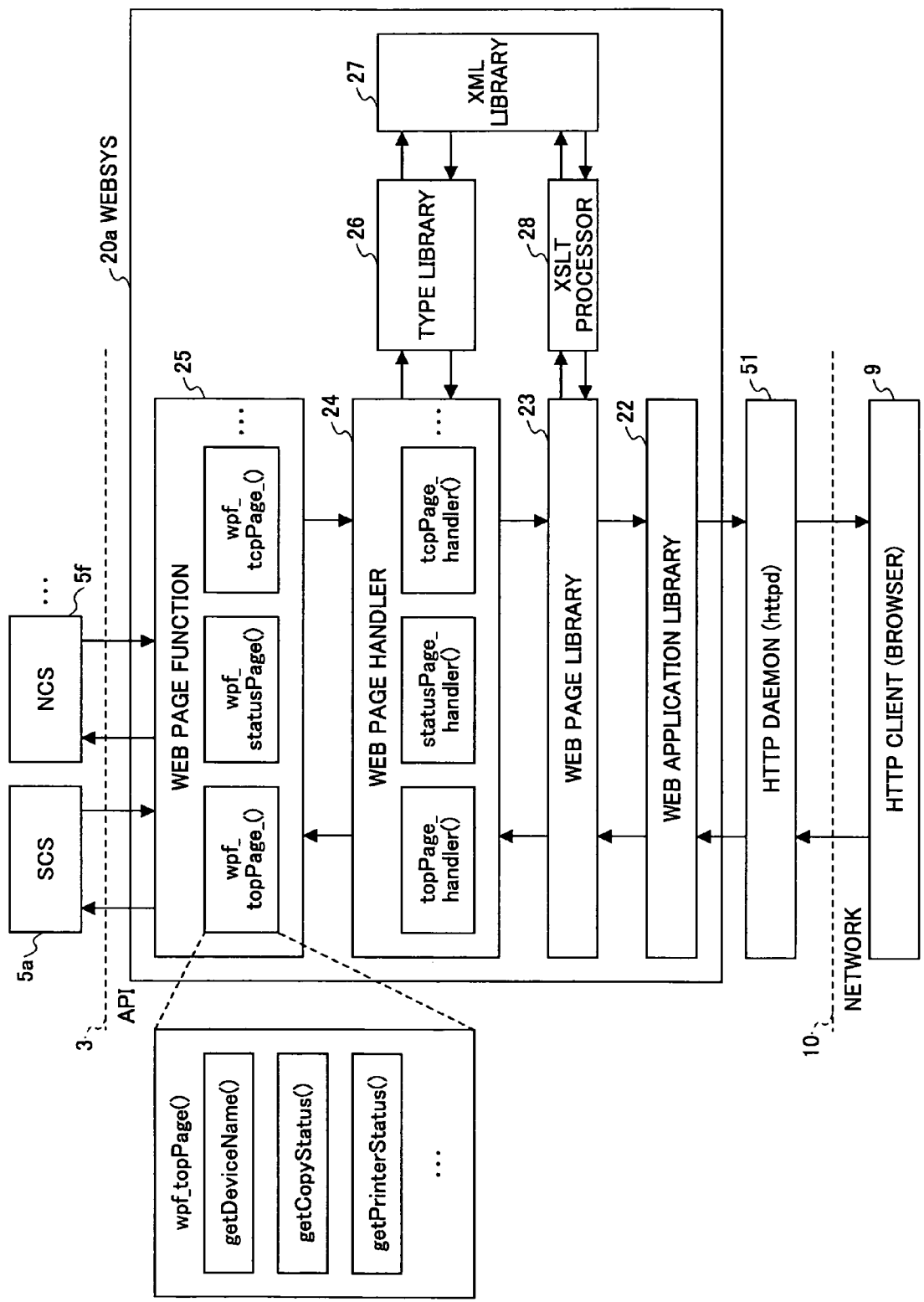
FIG. 4 is a block diagram showing a module configuration of the Web application according to the embodiment of the present invention.

FIG. 4 is a block diagram showing a module configuration of the Web application according to the embodiment of the present invention.

In FIG. 4, the Websys 20*a* of the Web application 20 is connected to an httpd (HyperText Transfer Protocol Daemon) 51 (a part of a function of the NCS 5*f* in FIG. 2) for distributing an HTTP request received through a network 10 from the HTTP client 9 using the Web browser and replying by sending a process result (in HTML (HyperText Markup Language), XML (eXtensible Markup Language), or text) of the Web application 20. Websys 20*a* includes a Web application library 22 and a Web page library 23 that are framework for developing Web applications providing various common functions, a Web page handler 24 for operating each Web page, a Web page function 25 for conducting a detail process concerning a display of the Web page, a type library 26 for converting process result data by describing in XML and serializing the process result data, an XML (eXtensible Markup Language) library 27 for analyzing XML data and describing in XML, and an XSLT (XSL Transformations) processor 28 for converting the process result described in XML into the process result described in HTML.

The Web page handler 24 and the Web page function 25 configure process functions to realize the Web page. In addition, the Web page function 25 communicates with the SCS 5*a* and the NCS 5*f* through the Interface 3 when the Web page function 25 conducts a process.

Moreover, the process result informed from the Web page function 25 is described in XML, so as that the process result can be serialized by the type library 26.

The option application 200 is a Web application stored in the memory card 116 as an external recording medium such as the SD card, or the like. The option application 200 is not originally implemented in the image forming apparatus 1 and is provided as an option that is sold separately, and setting information (parameters) of the option application 200 is provided as the Web service. As the option application 200, for example, there is an application to provide a function of BMLinkS. The BMLinkS is a standard specification for a common internet protocol for a job control procedure, a status reference, and a like with respect to at least one GA (Office Automation) having at least one of functions such as a printer, a scanner, a storage, a FAX transmission, and a like that exist on a network. For example, the BMLinkS includes a discovery function for searching for an GA device that can be used through the network.

In the following, a functional configuration concerning a process providing the setting information of the Web applications including the option application 200 to refer (read out) as the Web service will be described with reference to FIG. 5.

Figure 5:
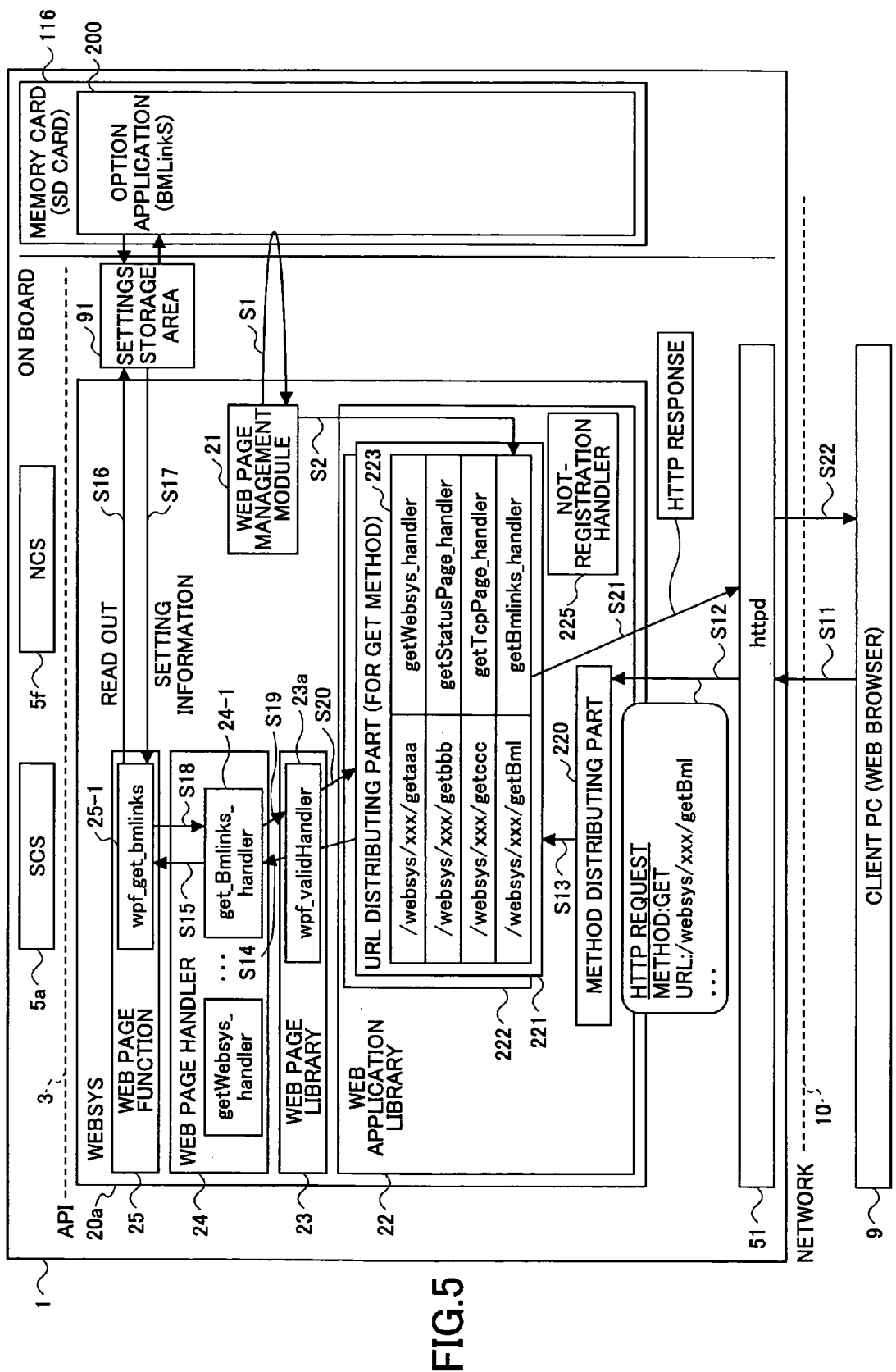
FIG. 5 is a diagram showing a functional configuration concerning a process for providing a reference of the setting information as the Web service, according to the embodiment of the present invention.

FIG. 5 is a diagram showing a functional configuration concerning a process for providing a reference of the setting information as the Web service, according to the embodiment of the present invention. In FIG. 5, the image forming apparatus 1 mounting the memory card 116.

The memory card 116 storing the option application 200 is detachable at arbitrary timing, is electrically connected when the memory card 116 is mounted to the image forming apparatus 1 while the image forming apparatus 1 is operated, and is automatically executed by receiving power from the image forming apparatus 1. In general, since the option application 200 only provides a few Web pages, the option application 200 conducts a process concerning a distribution of a process, a display and a like of the Web page, which another Web application (for example, Websys 20a) is required to conduct. The option application 200 is a process function.

In FIG. 5, as a functional configuration necessary to realize a process providing a reference of the setting information of the option application 200 as the Web service, the Websys 20a of the image forming apparatus 1 mainly includes a Web page management module 21, a Web application library 22, a Web page handler 24, and a Web page function 25.

The Web page management module 21 refers to a table setting information concerning the option application 200, and confirms an existence of the option application 200 stored in the memory card 116, when the image forming apparatus 1 is activated or at a predetermined time intervals. In this case, the Web page management module 21 confirms each existence of a plurality of the option applications 200 when the plurality of the option applications 200 are stored in the memory card 116. In this embodiment, a case of storing the BMLinkS as the option application 200 will be described.

The Web page management module 21 confirms each existence of the Web application 20 and the option application 200 when the image forming apparatus 1 is activated or at predetermined time intervals (step S1), and registers each existence being confirmed to a URL-process function table 223 of the URL distributing part 221 of the Web application library 22 (step S2). Simultaneously, the Web page management module 21 registers each existence to the URL distributing part 222. The Web page management module 21 conducts the same process at predetermined time intervals.

The option application 200 is executed after image forming apparatus 1 is activated, and appropriately writes in or refers to the setting information to/from a settings storage area 91.

Moreover, the Web application library 22 for distributing a process of the HTTP request informed from the httpd 51 includes a method distributing part 220 for distributing a process to one of URL distributing parts 221 and 222 corresponding to respective methods, the URL distributing part 221 and 222 for distributing the process to the Web page handler 24 corresponding to respective URLs, and a not-registration handler 225 for conducting a process in a case in that the URL is not registered.

A process is distributed to the URL distributing part 221 when the method is a GET method, and the process is distributed to the URL distributing part 222 (see FIG. 6) when the method is a POST method.

The not-registration handler 225 sends a "Not Found" error screen showing that the Web page corresponding to the HTTP request received from the HTTP client 9 does not exist.

Furthermore, the settings storage area 91 is provided to the image forming apparatus 1. The settings storage area 91 is a predetermined storage area provided to the MEM-P 107 or the HDD 104, and is used to store the setting information (parameters) of each of applications included in the application layer 2 in FIG. 2, and stores contents even if the power is off.

Referring to FIG. 5, a process as the Web service for providing a reference of the setting information of the option application 200 will be described.

The HTTP client 9 using the Web browser sends an HTTP request for referring to the setting information of the option application 200 to the image forming apparatus 1 through the network 10 (step S11).

In the image forming apparatus 1, when the httpd 51 receives the HTTP request, the httpd 51 informs the HTTP request to the method distributing part 220 of the Web application library 22 (step S12). It is assumed that "METHOD: GET" and URL:/websys/xxx/getBml are set in the HTTP request received through the network 10.

The method distributing part 220 informs the HTTP request to the URL distributing part 221 for the get method since "METHOD" is "GET" (step S13). The URL distributing part 221 refers to the URL-process function table 223, and conducts a function call for "getBmlinks_handler" corresponding to "URL:/websys/xxx/getBml" indicated by the HTTP request through the Web page library 23.

In the Web page library 23, a function "wpf_validHandler" 23a determines validity of the HTTP request, and then refers to the Web page handler 24 (step S14). In the Web page handler 24, a function "getBmlinks_handler" 24-1 converts a data format to be capable of conducting a function call by using the type library 26 and the XML library 27 (FIG. 4), and makes the function call to call a function "wpf_get_bmlinks" 25-1 of the Web page function 25 (step S15).

The function "wpf_get_bmlinks" 25-1 requests to read out the setting information of the option application stored in the settings storage area 91 (step S16). The settings storage area 91 informs the setting information of the option application 200 to the function "wpf_get_bmlinks" 25-1 (step S17).

The function "wpf_get_bmlinks" 25-1 informs the setting information as a return value to the function "getBmlinks_handler" 24-1 (step S18). The function "getBmlinks_handler" 24-1 serializes the setting information as the return value by the type library 26 and the XML library 27, and informs the setting information being serialized to the function "wpf_validHandler" 23a of the Web page library 23 (step S19).

The setting information being serialized by the function "wpf_validHandler" 23a of the Web page library 23 is converted into an HTML format by the XSLT processor 28 to form a Web page, and is informed to the URL distributing part 221 (step S20).

The URL distributing part 221 informs the Web page showing the setting information as the HTTP response to the httpd 51 (step S21), and the httpd 51 provides the Web page to the HTTP client 9 through the network 10 (step S22). Then, the Web page showing the setting information is displayed at the Web browser of the HTTP client 9.

A functional configuration concerning a process as the Web service for setting (writing to) the setting information of each of the Web applications including the option application 200 will be described with reference to FIG. 6.

Figure 6:
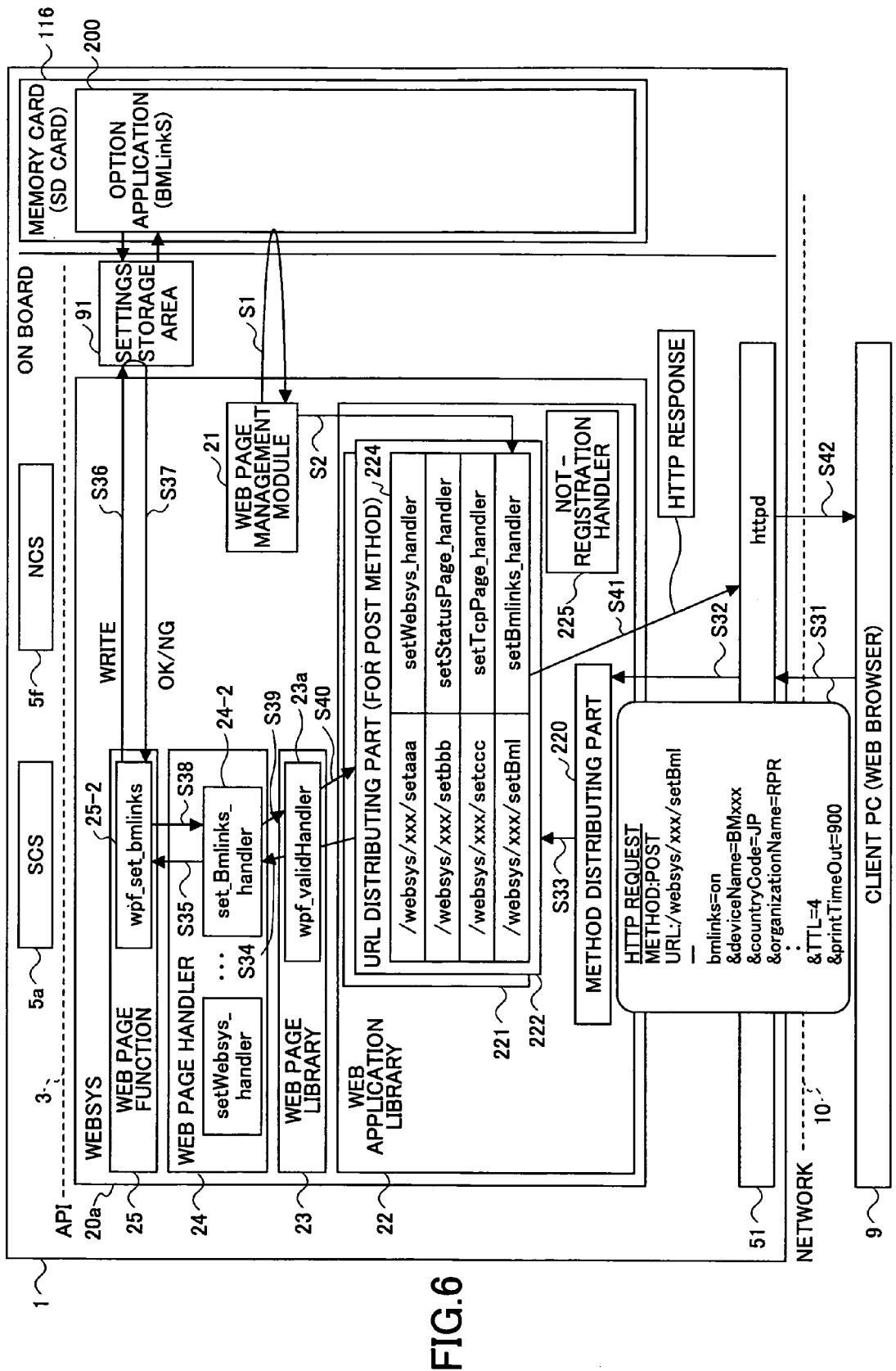
FIG. 6 is a diagram showing a functional configuration as the Web service for setting the setting information according to the embodiment of the present invention.

FIG. 6 is a diagram showing the functional configuration as the Web service for setting the setting information according to the embodiment of the present invention. In FIG. 6, the functional configuration for realizing the process as the Web service for setting the setting information is the same as the functional configuration shown in FIG. 5, and an explanation thereof will be omitted.

Referring to FIG. 6, the process as the Web service for setting the setting information of the option application 200 will be described.

The HTTP client 9 using the Web browser sends an HTTP request for setting the setting information of the option application 200 to the image forming apparatus through the network 10 (step S31).

Figure 7:
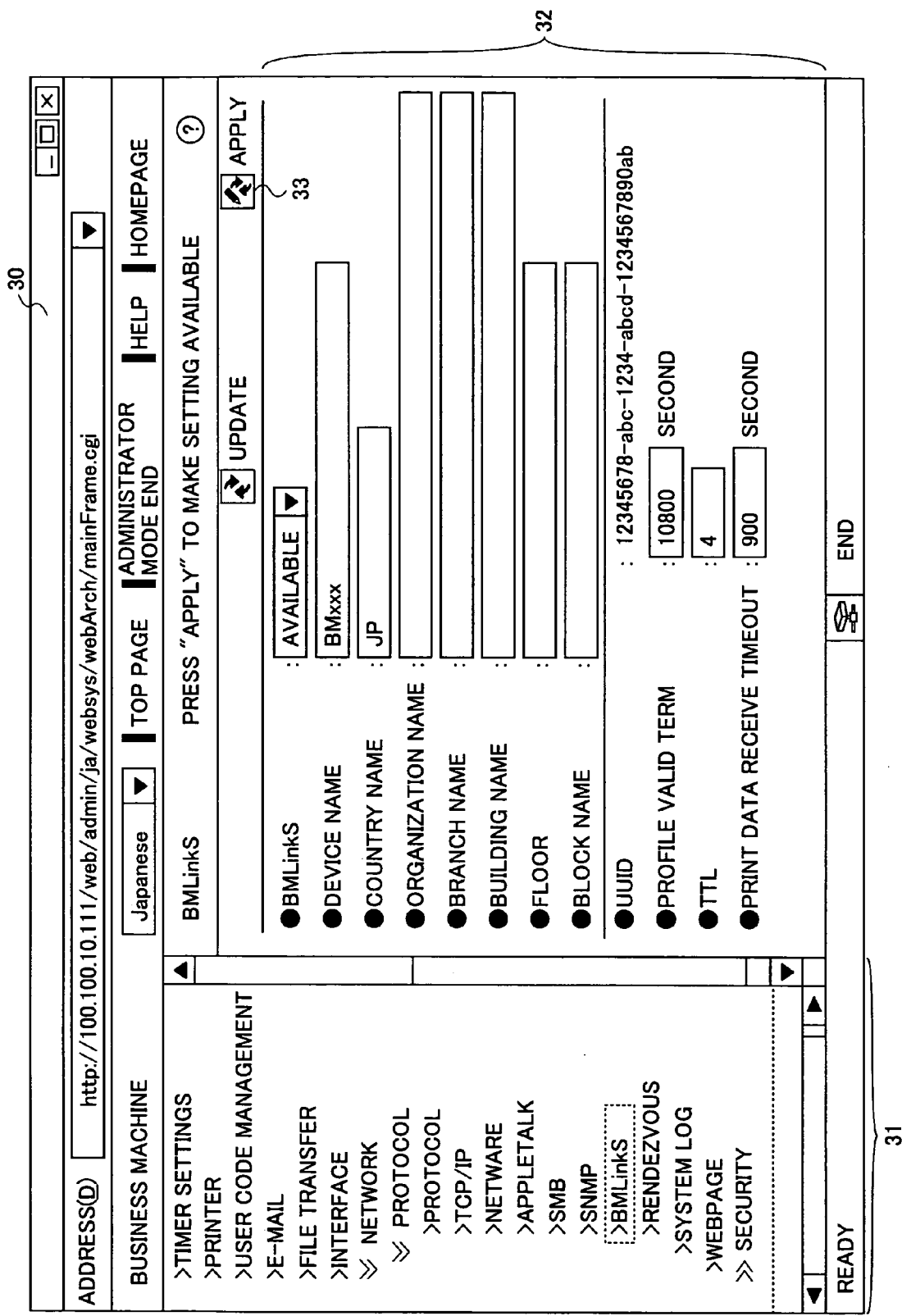
FIG. 7 is a diagram showing an example of a screen for setting the setting information with respect to an option application according to the embodiment of the present invention.

A user of the HTTP client 9 sends the HTTP request by inputting necessary items to a screen as shown in FIG. 7 displayed at the Web browser. FIG. 7 is a diagram showing an example of a screen for setting the setting information with respect to the option application according to the embodiment of the present invention. In a screen 30 shown in FIG. 7, for example, when the user selects "BMLinkS" from the index area 31 as the option application 200, setting items and set-table area are displayed in a setting area 32. For example, the setting items include items of available or not available of BMLinkS, a device name, a country name, an organization name, a building name, a floor, a block name, a branch name, a UUID, a profile valid term, a TTL, a print data receive timeout, and a like. When the user inputs the setting information to the setting items displayed in the setting area 32 at the screen 30. When the user clicks an apply button 33, the HTTP request is sent to the image forming apparatus 1.

Referring to FIG. 6 again, in the image forming apparatus 1, when the httpd 51 receives the HTTP request, the httpd 51 informs the HTTP request to the method distributing part 220 of the Web application library 22 (step S32). In this case, in the HTTP request received from the HTTP client 9 through the network 10, "METHOD:POST" and "URL:/websys/xxx/setBml" are set and as the setting information, the followings are indicated:
bmlinks=on
&deviceName=BMPxxx
&countryCode=jp
&organizationName=RRR
. . .
&TTL=4
&printTimeOut=900
and a like.

The method distributing part 220 informs the HTTP request to the URL distributing part 222 for the post method since "METHOD" is "POST" (step S33). The URL distributing part 222 refers to the URL-process function table 224, and makes a function call to call a function "setBmlinks_handler" corresponding to "URL:/websys/xxx/setBml" indicated by the HTTP request through the Web page library 23 (step S34).

In the Web page library 23, the function "wpf_validHandler" 23a determines validity of the HTTP request, and a function "setBmlinks_handler" 24-2 of the Web page handler 24 converts the HTTP request to be a data format that can be called by a function call, by the type library 26 and the XML library 27 (FIG. 4) and makes the function call to call a function "wpf_set_bmlinks" 25-2 of the Web page function 25 (step S35).

The function "wpf_set_bmlinks" 25-2 requests the settings storage area 91 to write the setting information of the option application 200 (step S36). The settings storage area 91 writes the setting information of the option application 200 and informs a process result (for example, "OK" showing a process end or "NG" showing a process error) to the function "wpf_set_bmlinks" 25-2 (step S37).

The function "wpf_set_bmlinks" 25-2 informs the process result to the function "setBmlinks_handler" 24-2 as a return value (step S38). The function "setBmlinks_handler" 24-2 serializes the process result as the return value by the type library 26 and the XML library 27, and informs the process result being serialized to the function "wpf_validHandler" 23a of the Web page library 23 (step S39).

The process result being serialized is converted to be the HTML format by the XSLT processor 28 in the function "wpf_validHandler" 23a of the Web page library 23, so as to form the Web page, and then informs the Web page showing the process result to the URL distributing part 222 (step S40).

The URL distributing part 222 informs the Web page showing the process result as the HTTP response to the httpd 51 (step S41). The httpd 51 provides the Web page showing the process result to the HTTP client 9 through the network 10 (step S42). Then, the process result is displayed at the Web browser of the HTTP client 9.

Figure 8:
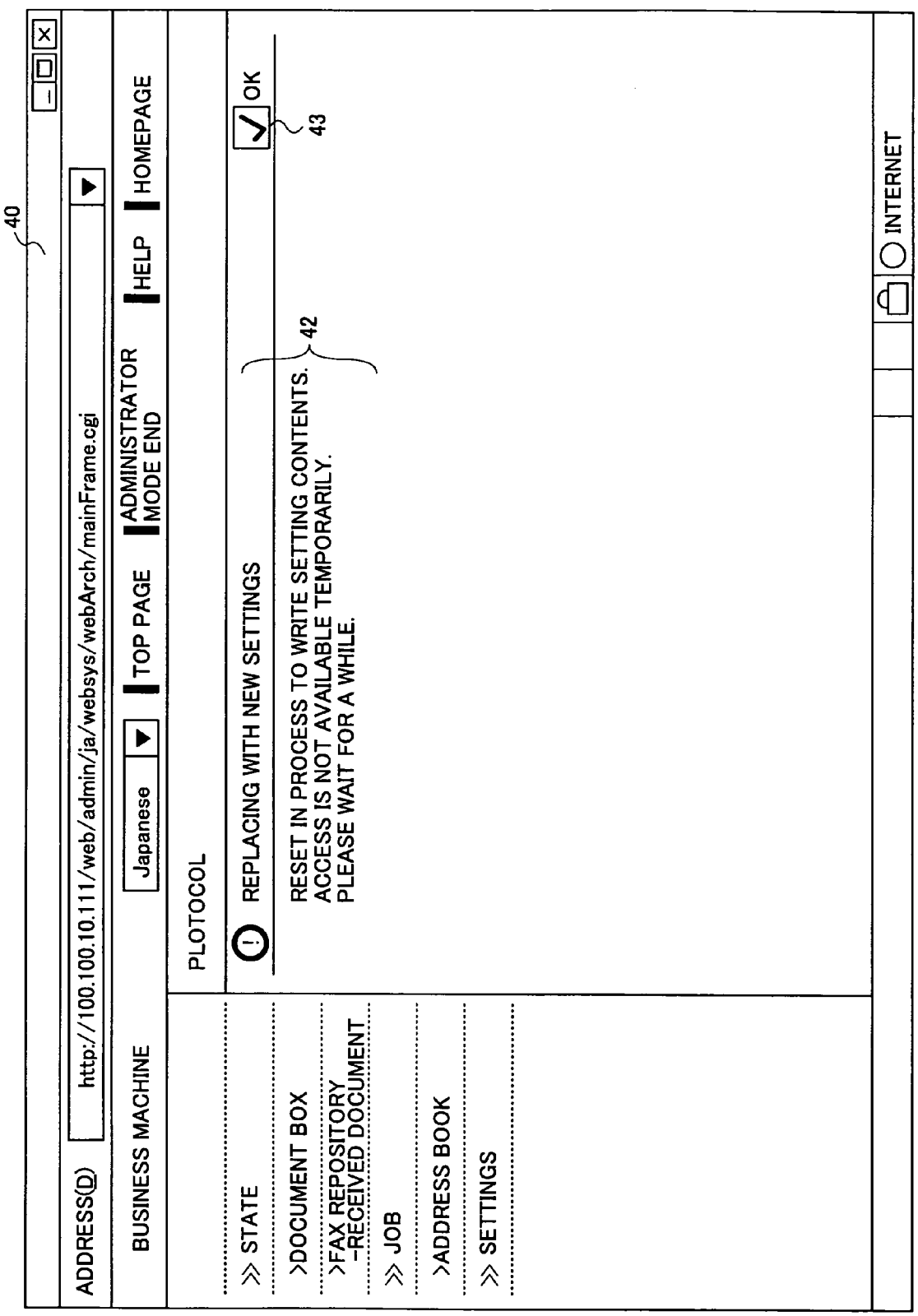
FIG. 8 is a diagram showing an example of a screen in which the setting information is set, according to the embodiment of the present invention.

For example, the process result displayed at the Web browser of the HTTP client 9 is a screen as shown in FIG. 8. FIG. 8 is a diagram showing an example of the screen in which the setting information is set, according to the embodiment of the present invention. In the example shown in FIG. 8, placing a checkmark in the box 43 labeled "OK" initiates the "REPLACING WITH NEW SETTINGS." As shown in FIG. 8, for example, in a screen 40, a message display area 42 displays "RESET IN PROGRESS TO WRITE SETTING CONTENTS." and "ACCESS IS NOT AVAILABLE TEMPORARILY. PLEASE WAIT FOR A WHILE." So as to inform the user that the setting information set by the user is written.

Next, for example, by mounting another memory card 11 6a, a functional configuration of informing the Web page that the setting information cannot be referred to in a case in that BMLinkS does not exist due to an option application 200a will be described with reference to FIG. 9.

Figure 9:
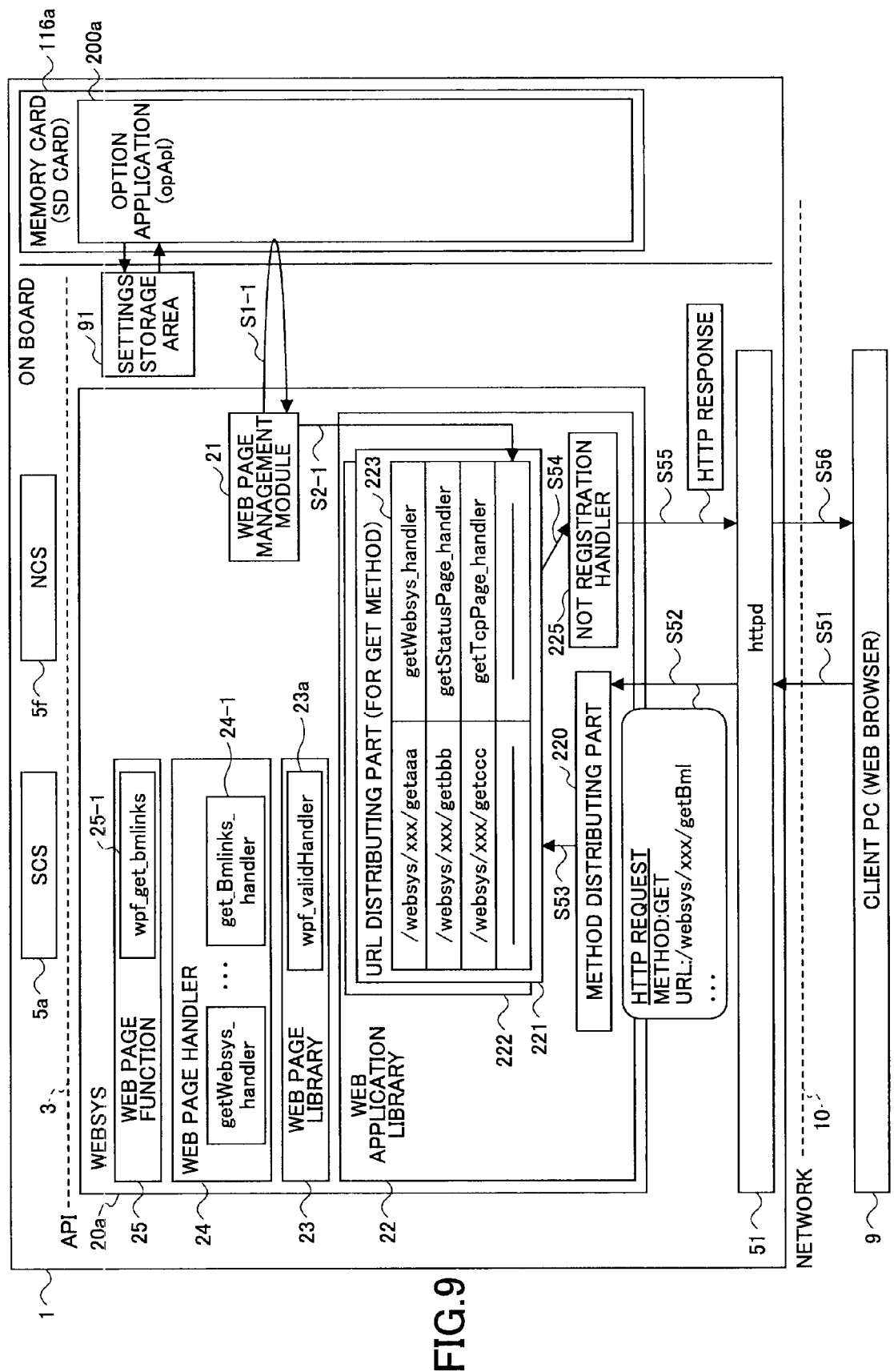
FIG. 9 is a diagram showing a functional configuration concerning a process for providing as the Web service that the setting information cannot be referred to, according to the embodiment of the present invention.

FIG. 9 is a diagram showing the functional configuration concerning a process for providing as the Web service that the setting information cannot be referred to, according to the embodiment of the present invention. In FIG. 9, the functional configuration for realizing the process for providing as the Web service that the setting information cannot be referred to is the same as the functional configuration shown in FIG. 5, and an explanation thereof will be omitted.

In FIG. 9, the Web page management module 21 confirms an existence of the option application 200 for executing BMLinkS with respect to the memory card 116a after a predetermined time (step S1-1). When the option application 200 is not existed, a registration concerning BMLinkS of the URL-process function table 223 of the URL distributing part 221 is set to be not-registration (step S2-1). A method for setting to be not-registration sets a predetermined area (line) for BMLinkS in the URL-process function table 223 to be blank, or may be a process such as a delete process for deleting the line for the BMLinkS which is registered.

A process as the Web service for providing information showing that the setting information of the option application 200 cannot be referred to will be described with reference to FIG. 9.

The HTTP client 9 using the Web browser sends an HTTP request for referring to the setting information of the option application 200 to the image forming apparatus 1 through the network 10 (step S51).

In the image forming apparatus 1, when the httpd 51 receives the HTTP request, the httpd 51 informs the HTTP request being received to the method distributing part 220 of the Web application library 22 (step S52). It is assumed that "METHOD:GET" and "URL:/websys/xxx/getBml" are set in the HTTP request being received through the network 10.

The method distributing part 220 informs the HTTP request to the URL distributing part 221 for the get method since "METHOD" is "GET" (step S53). The URL distributing part 221 refers the URL-process function table 223, and searches for a handler corresponding to "URL:/websys/xx/getBml" indicated in the HTTP request. In this case, since a corresponding handler is not registered, the URL distributing part 221 conducts a process for a case of "Not Found", and makes a function call to call the not-registration handler 225 (step S54).

The not-registration handler 225 informs the httpd 51 "Not Found" as an HTTP response showing that a Web page indicated by the HTTP request is not found (step S55). Then, the httpd 51 informs "Not Found" to the HTTP client 9 (step S56).

As described above, the Web page management module 21 confirms at predetermined intervals that the option application 200 is available or not available. When the Web page management module 21 confirms that the option application 200 is available, the HTTP request is distributed to the Web page function. On the other hand, when the Web page management module 21 confirms that the option application 200 is not available, a response is provided to the HTTP client 9 showing that the Web page is not found (for example, "Not Found").

Figure 10:
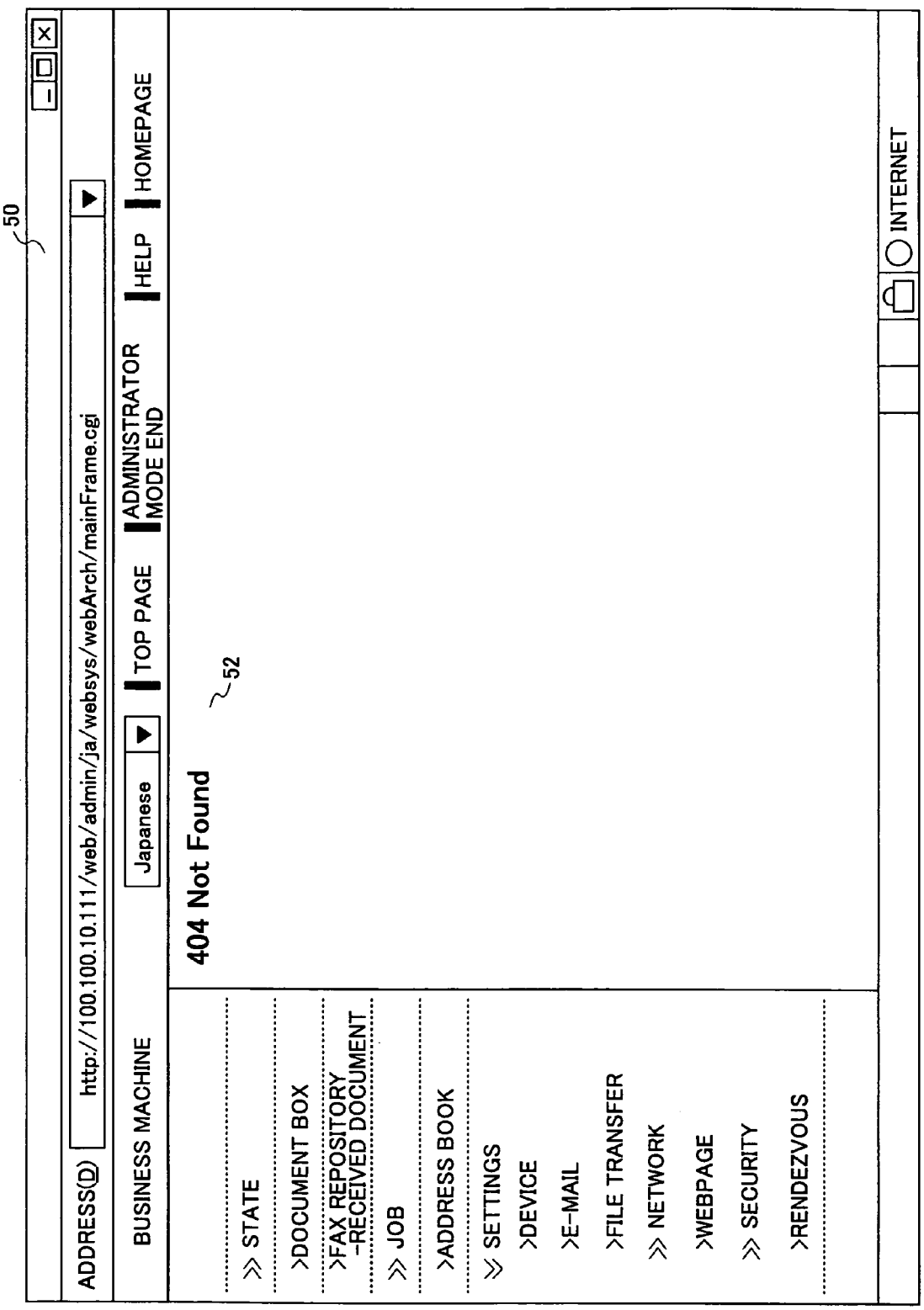
FIG. 10 is a diagram showing an example of a screen showing that the option application does not exist, according to the embodiment of the present invention.

FIG. 10 is a diagram showing an example of a screen showing that the option application does not exist, according to the embodiment of the present invention.

In a screen 50 shown in FIG. 10, for example, when BMLinkS does not exist as the option application 200 and the Web page for referring to or setting the setting information of BMLinkS is requested, a message 52 displaying "404 Not Found" is a message displayed by the not-registration handler 225.

Figure 11:
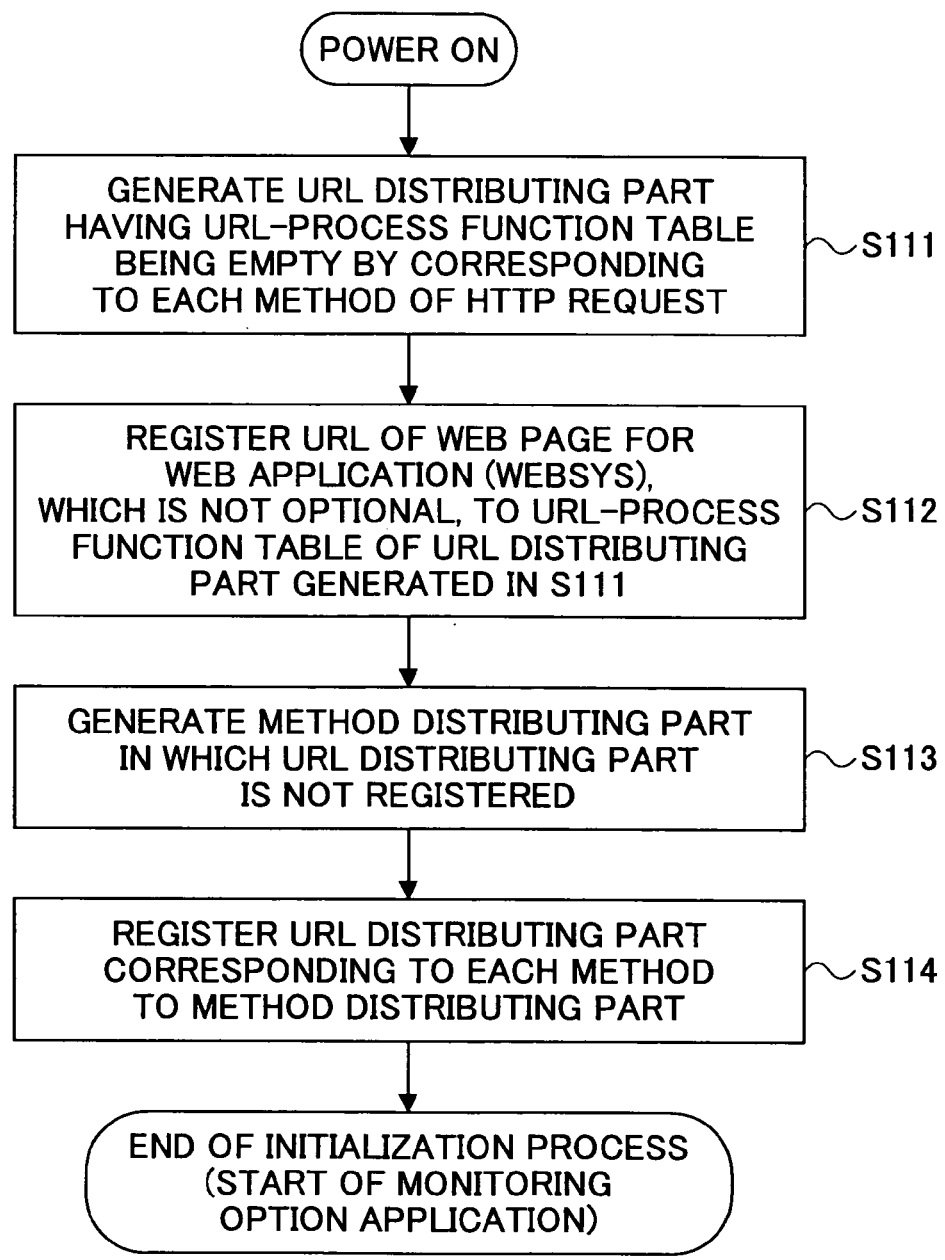
FIG. 11 is a flowchart for explaining an initialization process of the Web application by a Web management module according to the embodiment of the present invention.

FIG. 11 is a flowchart for explaining an initialization process of the Web application by the Web management module according to the embodiment of the present invention.

In FIG. 11, the Web page management module 21 is activated when the image forming apparatus 1 is turned on, and generates the URL distributing parts 221 and 222 having the URL-process function tables 223 and 224 being empty by corresponding to each method indicated in the HTTP request (step S111). Then, the URL specifying the Web page of the Web application (Websys) that is not the option application (on board) is registered to the URL-process function tables 223 and 224 of the URL distributing parts 221 and 222 generated in step S111 (step S112).

Moreover, the Web page management module 21 generates the method distributing part 220 to which the URL distributing parts 221 and 222 are not registered (step S113) Subsequently, the Web page management module 21 registers the URL distributing parts 221 and 222 corresponding to the get method and the post method, respectively, to the method distributing part 220 (step S114). That is, one of the URL distributing parts 221 and 222 is corresponded to for each method.

Figure 12:
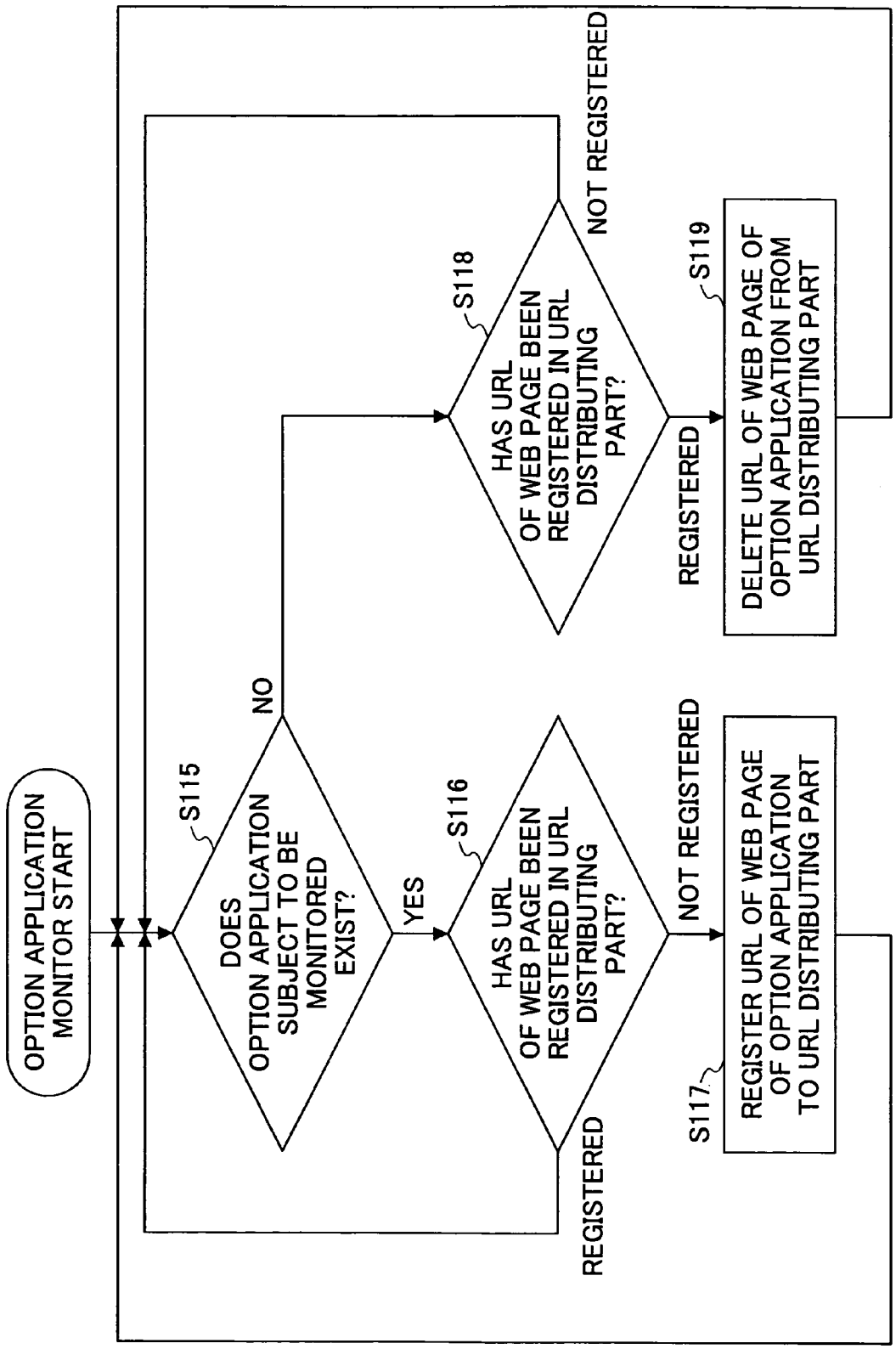
FIG. 12 is a flowchart for explaining a monitor process of the option application by the Web page management module according to the embodiment of the present invention.

The Web page management module 21 ends the initialization process and starts to monitor the option application 200 at the predetermined intervals as shown in FIG. 12.

FIG. 12 is a flowchart for explaining a monitor process of the option application by the Web page management module according to the embodiment of the present invention.

In FIG. 12, when the monitor process of the option application 200 starts, the Web page management module 21 determines whether or not the option application 200 (BMLinkS) as a monitor subject exists (step S115). When the option application 200 exists, the Web page management module 21 determines whether or not the URL of the Web page is registered to the URL distributing part 221 and 222 (step S116).

When it is determined in step S116 that the URL of the Web page is registered to the URL distributing part 221 and 222, the Web page management module 21 goes back to step S115 to repeat the same process described above for a next option application to be the monitor subject. When it is determined that all option applications are processed, the same process described above is repeated after the predetermined interval.

On the other hand, when it is determined in step S116 that the URL of the Web page is not registered to the URL distributing part 221 and 222, the Web page management module 21 registers the URL of the Web page for the option application 200 to the URL-process function tables 223 and 224 of the URL distributing parts 221 and 222, respectively (step S117), and goes back to step S115 to repeat the same process described above for a next option application to be the monitor subject, or when all option applications are processed, the Web page management module 21 repeats the same process described above after the predetermined interval.

When it is determined in step S115 that the option application 200 to be the monitor subject does not exist, that is, when the memory card 116 storing the option application 200 is removed from the image forming apparatus 1 or another memory card 116a is mounted to the image forming apparatus 1, the Web page management module 21 determines whether or not the URL of the Web page is registered to the URL distributing parts 221 and 222 (step S118). When it is determined in step S118 that the URL of the Web page is not registered to the URL distributing parts 221 and 222, the Web page management module 21 goes back to step S115 to repeat the same process described above with respect to a next option application to be the monitor subject, or when all option applications are processed, the Web page management module 21 repeats the same process described above after the predetermined interval.

On the other hand, when it is determined in step S118 that the URL of the Web page is registered to the URL distributing parts 221 and 222, the URL of the Web page of the option application 200 is deleted from the URL-process function table 223 and 224 (step S119). In this case, the URL distributing parts 221 and 222 become as shown in FIG. 9.

As a method for confirming an existence of the option application 200 to be the monitor subject in step S115, for example, the option application 200 may inform a process name thereof to the Web page management module 21 beforehand, and it may be checked whether or not a process registered by a thread of the Web page management module 21 exists. Alternatively, an execution file of the option application 200 (for example, an execution file of BMLinkS) may be registered, and it may be checked whether or not the program exists by an execution file name.

Figure 13:
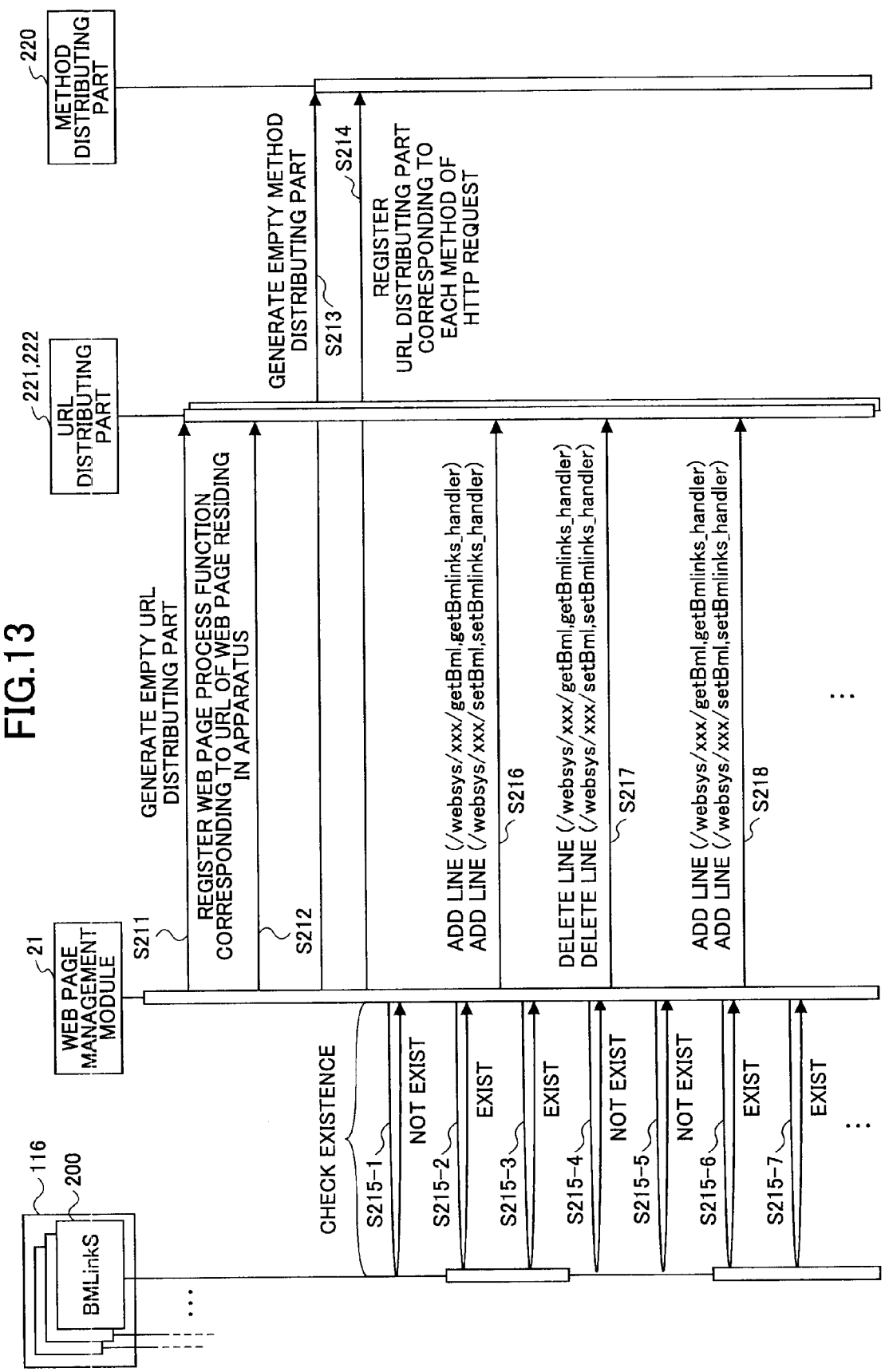
FIG. 13 is a diagram showing a process sequence for an application monitor, and URL registration and update by the Web page management module according to the embodiment of the present invention.

FIG. 13 is a diagram showing a process sequence for an application monitor, and URL registration and update by the Web page management module according to the embodiment of the present invention.

In FIG. 13, the Web page management module 21 creates the URL distributing parts 221 and 222 being empty (step S211), and registers a Web page process function corresponding to the URL of the Web page residing in the image forming apparatus 1 (step S212). In this case, registration processes concerning the Websys 20a, the Webdocbox 20b, the GPS-web 20c, and the Fax-web 20d of the Web application 20 shown in FIG. 2 are conducted.

Subsequently, the Web page management module 21 creates the method distributing part 220 being empty (step S213), and registers the URL distributing parts 221 and 222 corresponding to methods of the HTTP request (step S214).

After that, the Web page management module 21 checks the existence of the option application 200 with respect to the memory card 116 at the predetermined intervals (step S215). For example, it is assumed that the existence of the option application 200 is checked in steps S215-1, S215-2, S215-3, . . . at the predetermined intervals. In a case in that the plurality of option applications other than the option application 200 are stored in the memory card 116, the Web page management module 21 checks each existence of the plurality of option applications at the predetermined intervals.

For example, in step S215-1, since the memory card 116 has not been mounted to the image forming apparatus 1, it is determined that the option application 200 does not exist. In step S215-2 following to step S215-1, the memory card 116 is mounted, and it is determined that the option application 200 exists.

When the existence is confirmed, the Web page management module 21 adds a line showing a correspondence between "/websys/xxx/getBml" and "getBmlinks_handler" and adds a line showing a correspondence between "/websys/xxx/setBml" and "setBmlinks_handler", respectively, with respect to the URL-process function tables 223 and 224 of the URL distributing part 221 and 222 (step S216). These add processes correspond to steps S116 and S117.

In step S215-3 at a next timing, it is determined that the option application 200 exists. In this case, since the option application 200 has been already registered, the registration processes with respect to the URL distributing parts 221 and 222 are not conducted. This process in step S215-3 corresponds to the process in a case in that it is determined in step S116 in FIG. 12 that the option application 200 is registered.

Moreover, in step S215-4 at a next timing, the memory card 116 has been removed from the image forming apparatus 1, and thus, it is determined that the option application 200 does not exist. In this case, since the option application 200 has been still registered, the Web page management module 21 deletes the showing the correspondence between "/websys/xxx/getBml" and "getBmlinks_handler" and deletes a line showing the correspondence between "/websys/xxx/setBml" and "setBmlinks_handler", respectively, from the URL-process function table 223 and 224 (step S217). These processes in step S215-4 corresponds to the processes in step S118 and step S119 in FIG. 12.

In step S215-5 at a next timing, similar to the previous process, it is determined that the option application 200 does not exist. In this case, since a registration of the option application 200 is deleted, the option application 200 is not registered to the URL distributing parts 221 and 222. Accordingly, the Web page management module 21 does not conduct any process with respect to the URL distributing part 221 and 222. These processes correspond to the processes in step S115 and step S118 in FIG. 12, and especially correspond to the process in step S118 in which it is determined that the option application 200 is not registered.

Furthermore, in step S215-6 at a next timing, since the memory card 116 is mounted to the image forming apparatus 1, it is determined that the option application 200 exist. In this case, the same process as in S216 is conducted in step S218 and the same process in S215-3 is conducted in S215-7.

These processes described above are conducted by the Web page management module 21 while the image forming apparatus 1 is activated.

Next, a request distributing process for distributing a request to the option application 200 as Web application after the HTTP request is received will be described with reference to FIG. 14.

Figure 14:
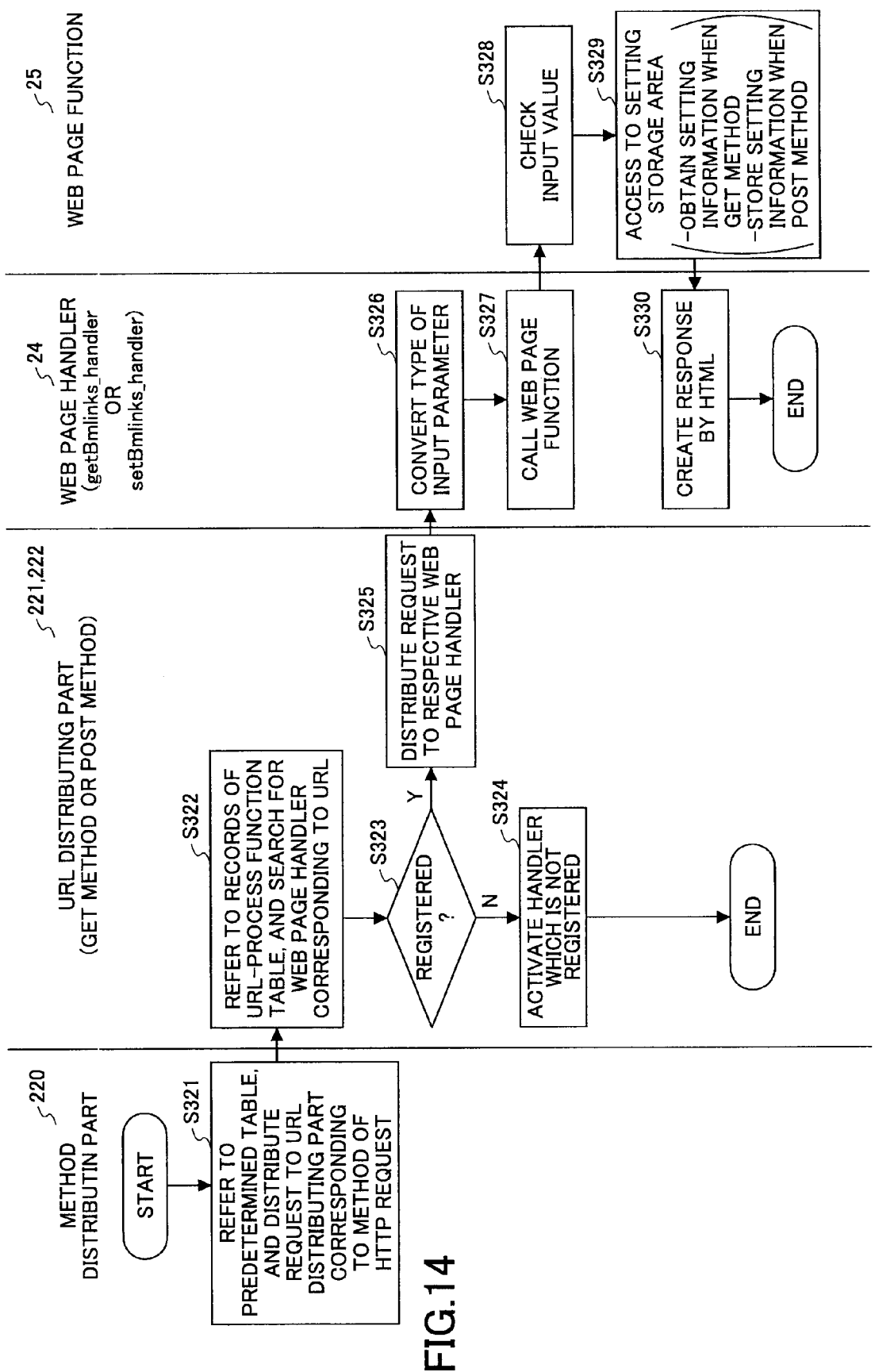
FIG. 14 is flowchart for explaining the request distributing process for the Web applications according to the embodiment of the present invention.

FIG. 14 is flowchart for explaining the request distributing process for the Web applications according to the embodiment of the present invention.

In FIG. 14, when the HTTP request is distributed to the method distributing part 220 from the httpd 51, the method distributing part 220 refers to a predetermined table registering the URL distributing part 221 or 222 corresponding a method, and distributes a request to the URL distributing part 221 or 222 corresponding a method indicated in the HTTP request (step S321).

The URL distributing part 221 or 222 refers the URL-process function table 223 or 224 and searches for the Web page handler 24 corresponding the URL (step S322). Based on a search result, the URL distributing part 221 or 222 determines whether or not the Web page handler 24 corresponding to the URL is registered (step S323). When it is determined that the Web page handler 24 corresponding to the URL is not registered, the URL distributing part 221 or 222 activates the not-registration handler 225 (step S324). On the other hand, when it is determined that the Web page handler 24 corresponding to the URL is registered, the URL distributing part 221 or 222 distributes the request to the Web page handler 24 corresponding to the URL (step S325). The request is distributed to the function "getBmlinks_handler" 24-1 in a case of the get method, and the request is distributed to the function "setBmlinks_handler" 24-2 in a case of the post method.

The Web page handler 24 converts a data type of input parameters by the type library 26 and the XML library 27 (step S326), and calls the Web page function 25 (step S327) the function "wpf_get_bmlinks" 25-1 is called in a case of the function "getBmlinks_handler" 24-1, and the function "wpf_set_bmlinks" 25-2 is called in a case of the function "setBmlinks_handler" 24-2.

The Web page function 25 checks input values (step S328), and then, accesses the settings storage area 91 (step S329). In the case of the get method, the setting information is obtained from the settings storage area 91 by the function "wpf_get_bmlinks" 25-1. In the case of the post method, the setting information is stored to the settings storage area 91 by the function "wpf_set_bmlinks" 25-2.

When a process result of the access is received from the Web page function 25, the Web page handler 24 describes the process result in XML by the type library 26 and the XML library 27, and the Web page library 23 creates a response by converting the process result into the HTML format by the XSLT processor 28 (step S330).

Figure 15:
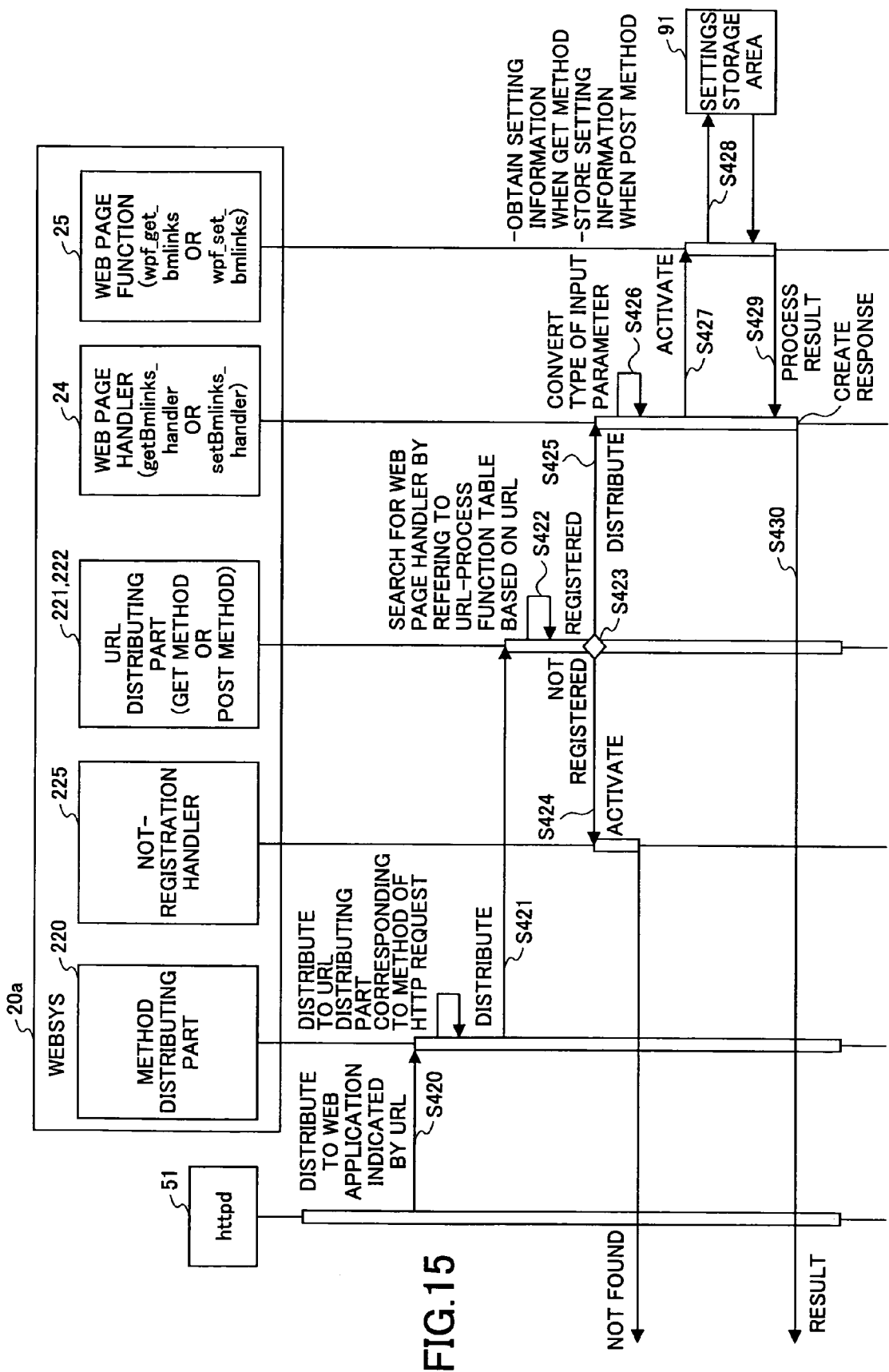
FIG. 15 is a diagram showing a process sequence for distributing the request to a relative Web application according to the embodiment of the present invention.

FIG. 15 is a diagram showing a process sequence for distributing the request to a relative Web application according to the embodiment of the present invention.

In FIG. 15, the HTTP request received by the httpd 51 is distributed to a Web application indicated by the URL (step S420). In this case, the request is distributed to the Websys 20a, and further distributed to the URL distributing part 221 or 222 corresponding to the method of the HTTP request (step S421).

The URL distributing part 221 or 222 searches for the Web page handler 24 corresponding to the URL by referring to the URL-process function table 223 or 224 (step S422). The URL distributing part 221 or 222 determines based on a search result whether or not the Web page handler 24 corresponding to the URL is registered (step S423). When it is determined that the Web page handler 24 corresponding to the URL is not registered, the URL distributing part 221 or 222 executes the not-registration handler 225 to conduct a process for informing "Not Found" to the HTTP client 9 (step S424). On the other hand, when it is determined that the Web page handler 24 corresponding to the URL is registered, the URL distributing part 221 or 222 distributes the request to the Web page handler 24 corresponding to the URL (step S425). The request is distributed to the function "getBmlinks_handler" 24-1 in the case of the get method, and the request is distributed to the function "setBmlinks$_{13}$ handler" 24-2 in the case of the post method.

The Web page handler 24 converts the data type of the input parameters by the type library 26 and the XML library 27 (step S426), and calls the Web page function 25 (step S427). The function "wpf_get_bmlinks" 25-1 is called in a case of the function "getBmlinks_handler" 24-1, and the function "wpf_set_bmlinks" 25-2 is called in a case of the function "setBmlinks_handler" 24-2.

The Web page function 25 checks the input values and then accesses the settings storage area 91 (step S428). The setting information is obtained from the settings storage area 91 by the function "wpf_get_bmlinks" 25-1 in the case of the get method, and the setting information is stored to the settings storage area 91 by the function "wpf_set_bmlinks" 25-2.

When the Web page handler 24 receives the process result of the access from the Web page function 25 (step S429), the Web page handler 24 describes the process result in XML by the type library 26 and the XML library 27, and the Web page library 23 creates a response by converting the process result described in XML into the HTML format by the XSLT processor 28 (step S430).

As described above, in the image forming apparatus 1 embedding the Web server function according to the present invention, furthermore, in a case of providing the option application 200 by mounting the memory card 116, such as the detachable SD card, to the image forming apparatus 1, the Web page management module 21 confirms the existence of the option application 200 at the predetermined intervals. When it is determined that the option application 200 exists, an execution of the Web page function 25 can be conducted to refer to and set the setting information with respect to the option application 200. When it is determined that the option application 200 does not exist, instead of executing the Web page function 25, the not-registration handler 225 is conducted, so that the setting information (parameters) of the option application 200, which does not exist, cannot be referred to and set by the HTTP request.

According to the present invention, the option application 200 recorded in a detachable recording medium is monitored, and it is checked whether or not the option application 200 is available. Therefore, it is possible to distribute the request to a relative process function when it is determined that the option application is available.

The present invention is not limited to the specifically disclosed embodiments, and variations and modifications may be made without departing from the scope of the present invention.

The present application is based on the Japanese Priority Application No. 2003-404706 filed on Dec. 3, 2003, the entire contents of which are hereby incorporated by reference.

What is claimed is:

1. An embedded apparatus, comprising:
    an access executing unit configured to execute an access to parameters of an option application in response to an access request received from a user terminal through a network;
    a monitoring unit configured to periodically monitor an existence of the option application;
    an acceptance rejecting unit configured to reject an acceptance of the access request and disable the access executing unit to access the parameters of the option application when the monitoring unit determines that the option application does not exist when the access request is received;
    a Web page providing unit configured to generate a Web page showing an execution result of the access executing unit and provide the Web page to an access request originator;
    an error response sending unit configured to send an error response to the access request originator;
    a central processing unit configured to control the embedded apparatus: and
    a setting information maintaining unit configured to maintain the parameters of the option application within the embedded apparatus, wherein
    the option application is stored on a recording medium configured to be detachable from the embedded apparatus,
    the embedded apparatus is configured to enable and disable an operation of the option application while the embedded apparatus is operating,
    the access executing unit is configured to process the access to the parameters of the option application and an access to a Web application residing in the embedded apparatus in common,
    the Web page providing unit is configured to generate the Web page showing the execution result of the parameters of the option application,
    the acceptance rejecting unit is configured to execute the error response sending unit when an acceptance of the access request is rejected, and
    the error response is a response to inform the originator of the access request that a Web page corresponding to the access request does not exist.

2. The embedded apparatus as claimed in claim 1, wherein the setting information maintaining unit is shared with the access executing unit and the option application.

3. The embedded apparatus as claimed in claim 2, further comprising:
    a table managing unit, included in the monitoring unit, configured to manage a table showing a correspondence between a URL to be indicated by the access request and a process function for executing each of executing units being implemented in the access executing unit, as a monitor result by the monitoring unit; and
    an existence determining unit, included in the monitoring unit, configured to determine an existence of the option application by searching for the URL indicated by the access request from the table being managed by the table managing unit, wherein
    the monitoring unit is configured to maintain information showing the correspondence between the URL and the process function in the table when the option application exists, and delete the information showing the correspondence between the URL and the process function from the table when the option application does not exist, and
    the acceptance rejecting unit is executed when the existence determining unit determines that the option application does not exist.

4. The embedded apparatus as claimed in claim 3, further comprising:
    a distributing unit configured to distribute the access request by calling the process function corresponding to the URL when the existence determining unit determines that the option application exists.

5. The embedded apparatus as claimed in claim 1, wherein the access executing unit includes a read-out executing unit configured to read out the parameters being maintained in a setting information maintaining unit when the access indicates a reference of the parameters.

6. The embedded apparatus as claimed in claim 1, wherein the access executing unit includes a write-in executing unit configured to write the parameters in a setting information maintaining unit when the access indicates settings of the parameters.

7. The embedded apparatus as claimed in claim 1, wherein the embedded apparatus includes a storage medium interface configured to be detachably connected to the recording medium.

8. The embedded apparatus as claimed in claim 1, wherein the embedded apparatus includes a storage unit configured to store information.

9. A system including an embedded apparatus and a user terminal to access parameters of an option application through a network, said embedded apparatus comprising:
   an access executing unit configured to execute the access to the parameters of the option application in response to an access request received from the user terminal through the network;
   a monitoring unit configured to periodically monitor an existence of the option application;
   an acceptance rejecting unit configured to reject an acceptance of the access request received from the user terminal through the network, and disable access to the parameters of the option application when it is determined by the monitoring unit that the option application does not exist when the access request is received;
   a Web page providing unit configured to generate a Web page showing an execution result by the access executing unit and provide the Web page to an access request originator;
   an error response sending unit configured to send an error response to the access request originator; and
   a setting information maintaining unit configured to maintain parameters of the option application within the embedded apparatus, wherein
   the option application is stored on a recording medium configured to be detachable from the embedded apparatus, and
   the embedded apparatus is configured to enable and disable an operation of the option application while the embedded apparatus is operating,
   the access executing unit is configured to process the access to the parameters of the option application and an access to a Web application residing in the embedded apparatus in common,
   the Web page providing unit is configured to generate the Web page showing the execution result of the parameters of the option application,
   the acceptance rejecting unit is configured to execute the error response sending unit when the acceptance of the access request is rejected, and
   the error response is a response to inform the originator of the access request that a Web page corresponding to the access request does not exist.

10. An option application executing method conducted in an embedded apparatus including a Web server function and a plug and play function which enables and disables an operation of an option application by a detachable recording medium recording the option application while the embedded apparatus is operating, said option application executing method comprising:
   executing an access to parameters of the option application in response to an access request received from a user terminal through a network;
   monitoring periodically an existence of the option application;
   rejecting an acceptance of an access request and disabling the access to the parameters of the option application when it is determined in the monitoring an existence of the option application that the option application does not exist when the access request is received;
   generating a Web page showing an execution result and providing the Web page to an access request originator;
   sending an error response to the access request originator when the acceptance of the access request is rejected; and
   maintaining the parameters of the option application within the embedded apparatus.

11. A computer-readable recording medium recorded with a program for causing a computer, as an embedded apparatus including a Web server function and a plug and play function, to enable and disable an operation of an option application by a detachable recording medium recording the option application while the embedded apparatus is operating, the program, when executed, causing a processor to perform a method comprising:
   executing an access to parameters of the option application in response to an access request received from a user terminal through a network;
   monitoring periodically an existence of the option application;
   rejecting an acceptance of an access request and disabling the access to the parameters of the option application when it is determined in the monitoring an existence of the option application that the option application does not exist when the access request is received;
   generating a Web page showing an execution result and providing the Web page to an access request originator;
   sending an error response to the access request originator when the acceptance of the access request is rejected; and
   maintaining the parameters of the option application within the embedded apparatus.

12. An embedded apparatus comprising a central processing unit that controls the embedded apparatus, a storage medium interface to be detachably connected to a recording medium, and a storage unit that stores information, said embedded apparatus comprising:
   an access executing unit configured to execute an access to setting information of an option application in response to an access request received from a user terminal through a network, the setting information being stored in the storage unit in the embedded apparatus;
   a monitoring unit configured to periodically monitor an existence of the option application stored on the recording medium configured to be detachable from the storage medium interface;
   an acceptance rejecting unit configured to reject an acceptance of the access request and disable the access executing unit to access the setting information of the option application when the monitoring unit determines that the option application does not exist when the access request is received; and
   a Web page providing unit configured to generate a Web page showing an execution result of the access executing unit in response to the access request and provide the Web page to an access request originator when the monitoring unit determines that the option application exists and the access executing unit executes the access to the setting information of the option application,
   wherein the embedded apparatus is configured to enable and disable an operation of the option application while the embedded apparatus is operating.

13. The embedded apparatus as claim 12, further comprising:
   an error response sending unit configured to send an error response to the access request originator, wherein the acceptance rejecting unit is configured to execute the error response sending unit when rejecting the acceptance of the access request, and the error response is a response to inform the access request originator that a Web page of the setting information corresponding to the access request does not exist.

14. The embedded apparatus as claim 12, wherein the Web page providing unit is configured to generate the Web page showing the execution result concerning the option application in response to the access request when the monitoring unit determines that the option application exists.

15. The embedded apparatus as claim 12, wherein the access executing unit is configured to process the access to the setting information of the option application and an access to the setting information of a Web application residing in the embedded apparatus in common.

* * * * *